United States Patent
Parker

(10) Patent No.: US 12,535,599 B2
(45) Date of Patent: Jan. 27, 2026

(54) DYNAMIC DOWN SAMPLING OF POSITION TRACKING DATA

(71) Applicant: S&P Global Inc., New York, NY (US)

(72) Inventor: Barnaby Scott Parker, San Francisco, CA (US)

(73) Assignee: S&P Global Inc., New York, NY (US)

( * ) Notice: Subject to any disclaimer, the term of this patent is extended or adjusted under 35 U.S.C. 154(b) by 99 days.

(21) Appl. No.: 18/543,907

(22) Filed: Dec. 18, 2023

(65) Prior Publication Data

US 2025/0199188 A1 Jun. 19, 2025

(51) Int. Cl.
  *G01S 19/52* (2010.01)
  *G01S 19/07* (2010.01)
  *G08G 3/00* (2006.01)

(52) U.S. Cl.
  CPC ............. *G01S 19/52* (2013.01); *G01S 19/07* (2013.01)

(58) Field of Classification Search
  CPC ......... G01S 19/52; G01S 19/07; B60W 10/18
  See application file for complete search history.

(56) References Cited

U.S. PATENT DOCUMENTS

| | | | |
|---|---|---|---|
| 7,564,404 B2 | 7/2009 | Katz | |
| 11,526,536 B2 | 12/2022 | Huang et al. | |
| 11,719,821 B2* | 8/2023 | Pazhayampallil | B60W 40/105 701/26 |
| 2011/0148634 A1 | 6/2011 | Putz | |
| 2018/0041965 A1 | 2/2018 | Korneluk et al. | |
| 2021/0390110 A1 | 12/2021 | Bjorkengren | |
| 2022/0026920 A1* | 1/2022 | Ebrahimi Afrouzi | G06N 7/01 |
| 2023/0117496 A1* | 4/2023 | Hubschneider | G01C 21/3461 701/414 |

OTHER PUBLICATIONS

European Patent Office Extended Search Report, dated Feb. 28, 2025, regarding Application No. EP24211748.9, 11 pages.
Parker et al., "High Throughput Geofence Break Detection," U.S. Appl. No. 18/543,851, filed Dec. 18, 2024, 79 pages.

(Continued)

*Primary Examiner* — Tan Q Nguyen
(74) *Attorney, Agent, or Firm* — Yee & Associates, P.C.

(57) ABSTRACT

Dynamically down sampling vehicle tracking data is provided. The method comprises receiving an original set of position data points from a vehicle, including a first and last data point. Each data point includes a timestamp. A path for the vehicle in four-dimensional hyperspace is simplified from the original set of points according to the Ramer-Douglas-Peucker algorithm. Positions are converted to three-dimension coordinates on a sphere with the timestamp comprising the fourth dimension. The simplified path comprises a reduced set of points that describe a minimum contiguous path of line segments between the first and last data points. All other position points from the original set satisfy a proximity criterion with regard to the minimum contiguous path. The reduced set represents the original set within a specified hyperspace tolerance and has a lower transmission bandwidth requirement. The reduced set of position points is then transmitted to users.

21 Claims, 25 Drawing Sheets

(56) References Cited

OTHER PUBLICATIONS

Eljabu Lubna et al: "Charting the Course of Ship Track Prediction: A Novel Approach for Maritime Traffic Analysis and Enhanced Situational Awareness", 2023 IEEE International Conference On Big Data (Bigdata), IEEE, Dec. 15, 2023 (Dec. 15, 2023), pp. 2588-2597, XP034520551, DOI: 10.1109/BIGDATA59044.2023. 10386714 [retrieved on Jan. 22, 2024].

Enmei Tu et al: "Modeling Historical AIS Data For Vessel Path Prediction: Comprehensive Treatment", arxiv.org, Cornell University Library, 201 Olin Library Cornell University Ithaca, NY 14853, Jan. 9, 2022 (Jan. 9, 2022), XP091123098.

European Patent Office Extended Search Report, dated Apr. 30, 2025, regarding Application No. EP24211750.5, 11 pages.

\* cited by examiner

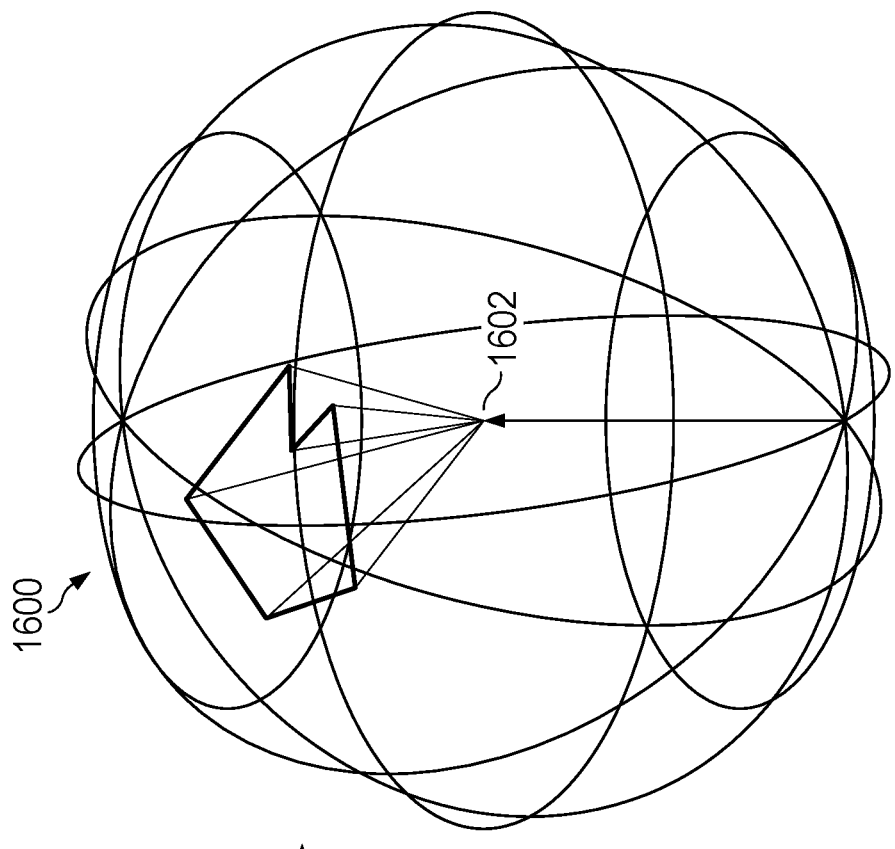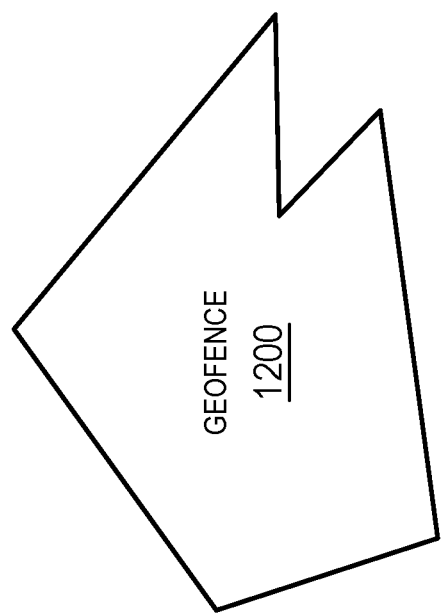
FIG. 16

DYNAMIC DOWN SAMPLING OF POSITION TRACKING DATA

CROSS-REFERENCE TO RELATED APPLICATION

This application is related to the following U.S. patent application entitled "High Throughput Geofence Break Detection," Ser. No. 18/543,851, filed even date hereof, assigned to the same assignee, and incorporated herein by reference in its entirety.

BACKGROUND INFORMATION

1. Field

The present disclosure relates generally to tracking and communications system, and more specifically to vessel tracking services.

2. Background

Tracking systems such as Automatic Identification System (AIS) allow ships and other vessels to exchange real-time information such as identity, position, course, heading, and speed. Transceivers onboard ships transmit this information, which can be received by other vessels, shore-based stations, and satellites. Such tracking systems allow vessels and authorities to monitor vessel movements and reduce the risk of collisions at sea by improving situational awareness.

Tracking systems such as AIS can be used in conjunction with geofencing technology. Geofencing comprises the creation of virtual geographic boundaries or zones defined around a specific geographic area such as a city or port. Geofencing utilizes location-based communications technologies such as GPS (Global Positioning System), RFID (radio-frequency identification), cellular data, etc., to trigger actions when an object such as a vessel enters or exits the area encompassed by a geofence.

SUMMARY

An illustrative embodiment provides a computer-implemented method of dynamically down sampling vehicle tracking data. The method comprises receiving an original set of position data points from a vehicle, wherein the set includes a first data point and a last data point, and wherein each data point includes a respective timestamp. A path for the vehicle in four-dimensional hyperspace is simplified from the original set of position data points according to the Ramer-Douglas-Peucker algorithm, wherein positions are converted to three-dimension Cartesian XYZ coordinates on a sphere with the timestamp comprising the fourth dimensional coordinate. The simplified path comprises a reduced set of position data points that describe a minimum contiguous path of line segments between the first data point and last data point such that all other position data points from the original set satisfy a proximity criterion with regard to the minimum contiguous path of line segments. The reduced set of position data points represents the original set of position data points within a specified hyperspace tolerance and has a lower transmission bandwidth requirement than the original set of position data points. The reduced set of position data points is then transmitted to a number of users.

Another illustrative embodiment provides a system for dynamically down sampling vehicle tracking data. The system comprising a storage device that stores program instructions and one or more processors operably connected to the storage device and configured to execute the program instructions to cause the system to: receive an original set of position data points from a vehicle, wherein the set includes a first data point and a last data point, and wherein each data point includes a respective timestamp; simplify a path for the vehicle in four-dimensional hyperspace from the original set of position data points according to the Ramer-Douglas-Peucker algorithm, wherein positions are converted to three-dimension Cartesian XYZ coordinates on a sphere with the timestamp comprising the fourth dimensional coordinate, and wherein the simplified path comprises a reduced set of position data points that describe a minimum contiguous path of line segments between the first data point and last data point such that all other position data points from the original set satisfy a proximity criterion with regard to the minimum contiguous path of line segments, and wherein the reduced set of position data points represents the original set of position data points within a specified hyperspace tolerance and has a lower transmission bandwidth requirement than the original set of position data points; and transmit the reduced set of position data points to a number of users.

Another illustrative embodiment provides a computer program product for dynamically down sampling vehicle tracking data. The computer program product comprising a computer-readable storage medium having program instructions embodied thereon to perform the steps of: receiving an original set of position data points from a vehicle, wherein the set includes a first data point and a last data point, and wherein each data point includes a respective timestamp; simplifying a path for the vehicle in four-dimensional hyperspace from the original set of position data points according to the Ramer-Douglas-Peucker algorithm, wherein positions are converted to three-dimension Cartesian XYZ coordinates on a sphere with the timestamp comprising the fourth dimensional coordinate, and wherein the simplified path comprises a reduced set of position data points that describe a minimum contiguous path of line segments between the first data point and last data point such that all other position data points from the original set satisfy a proximity criterion with regard to the minimum contiguous path of line segments, and wherein the reduced set of position data points represents the original set of position data points within a specified hyperspace tolerance and has a lower transmission bandwidth requirement than the original set of position data points; and transmitting the reduced set of position data points to a number of users.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 depicts the projection of a geofenced area onto the earth's surface;

DETAILED DESCRIPTION

The illustrative embodiments recognize and take into account that maritime vessels tend to travel in slow turning and predictable paths through time and space. However, considering the typical speeds of movement of maritime vessels, the frequent position updates transmitted by vessels represent excessive information to describe the vessels' general movements since many points are colinear. As a result, the aggregate bandwidth of real-time AIS data represents a significant data engineering challenge.

The illustrative embodiments also recognize and take into account that current approaches to down sampling in the maritime domain are crude and based on limiting message frequency globally or discarding messages from stationary vessels.

The illustrative embodiments also recognize and take into account that location services for detecting geofence interactions from positional updates are typically offered at high cost. Such implementations appear to only detect events when a positional update falls within a geofence and cannot properly detect intersections of zones against a movement segment where the start and end position of the segment are outside the zone. Furthermore, standards for geospatial analysis such as GDAL (Geospatial Data Abstraction Library) treat the problem as a two-dimensional problem.

The illustrative embodiments provide a method to eliminate the excessive data from a string of vessel positions while still retaining the space-time positions needed to adequately describe a vessel's movements, for visualization, storage, and or downstream generation of events (such as geofence breaks).

The illustrative embodiments also provide a method to detect geofence break events in real-time from high bandwidth streams of vessel positions evaluated against complex geometries. The illustrative embodiments utilize three-dimensional vector algebra to compute a true great circle/great arc analysis of intersection between two direct paths on a sphere surface rather than resorting to rhumb line simplifications. This reframing of great arc intersection as a segment-triangle intersection in 3D simplifies the mathematical treatment of edge cases such as 3D to 2D projection distortion and is well suited to advanced Single Instruction Multiple Data (SIMD) instructions on modern CPU architectures.

The illustrative embodiments also provide a spherical spatial discretization function and related data structure suited to efficient intersection detection for geofences and movements on a spherical surface.

Figure 1:
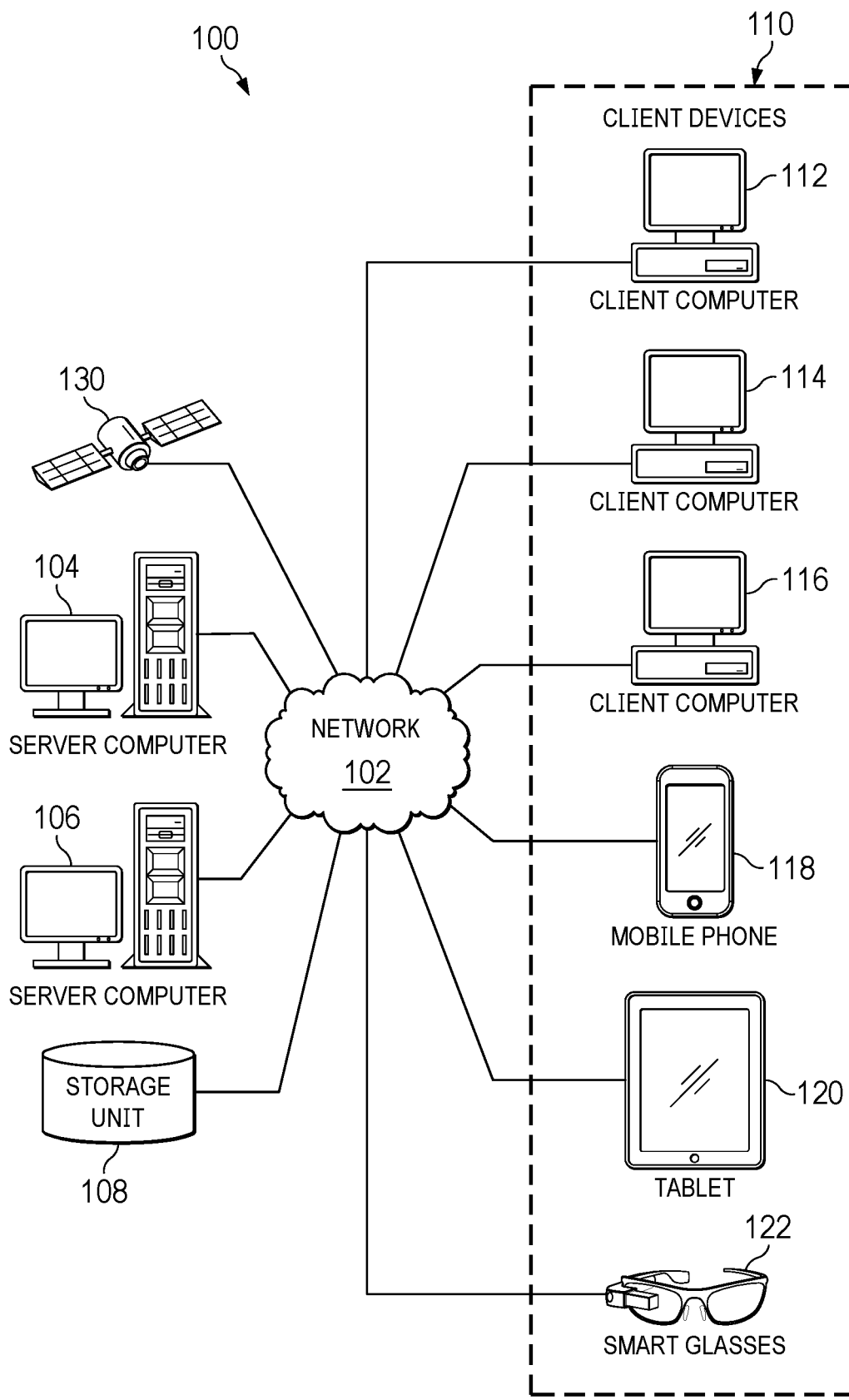
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

A number of satellites such as satellite 130 might provide communications between client devices 110 and server computers 104, 106 and form part of the infrastructure of network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
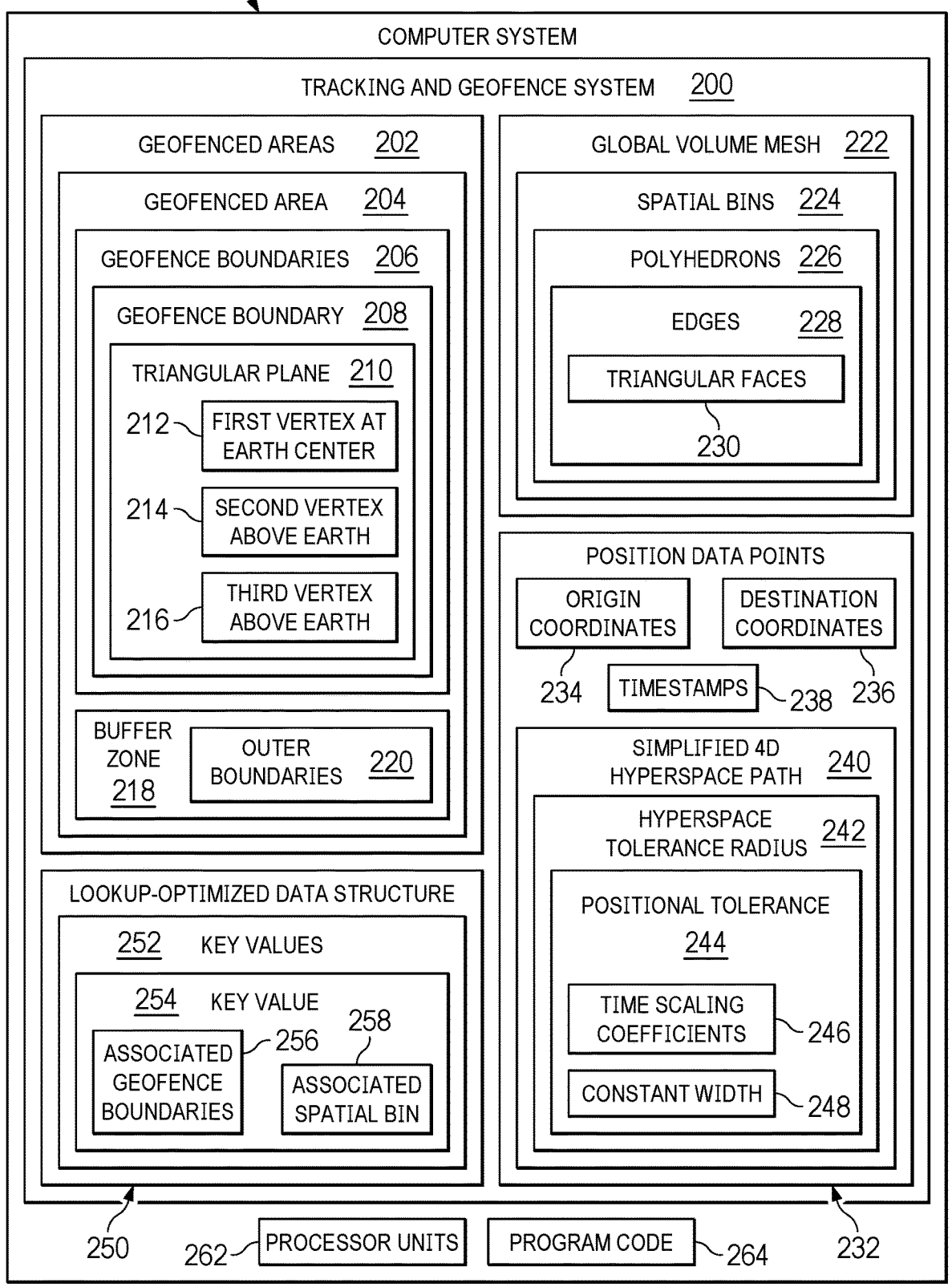
FIG. 2 is a block diagram of a tracking and geofence system depicted in accordance with an illustrative embodiment.

FIG. 2 is a block diagram of a tracking and geofence system depicted in accordance with an illustrative embodiment. Tracking and geofence system 200 might be implemented in network data processing system 100 in FIG. 1.

Tracking and geofence system 200 monitors the movement of vehicles (e.g., maritime vessels). These movement can be tracked with regard to their ingress and egress from different geofenced areas 202 around the world. Each geofenced area 204 is enclosed by a number of geofence boundaries 206 (see FIG. 12). Each geofence boundary 208 is defined with reference to a triangular plane 210. This triangular plane 210 is defined by a first vertex 212 at the center of the earth, a second vertex 214 above the earth's surface, and a third vertex 216 also above the earth's surface (see FIG. 15B).

Each geofenced area 204 might also include a buffer zone 218 that comprises a number of outer boundaries 220 that match the contours of the geofenced area 206. This buffer zone 218 can assist in reducing the number of geofence ingress and egress events reported, and thereby reduce associated bandwidth demands, by accounting for local "jitter" in the movement of vessels near geofence boundaries (see FIGS. 12-14).

Monitoring and reporting ingress and egress to and from geofence areas 202 can be further assisted by the use of a global volume mesh 222 that organizes the space inside and around the earth into a number of polyhedron volumes representing spatial bins 224 (see FIGS. 18B-19C). Geofence boundaries 206 of a given geofenced area 204 might fall within one or more spatial bins 224. The spatial bins 224 are defined as non-intersecting polyhedrons 226 comprised of four triangular faces 230 extending into space from the earth's center (see FIG. 19B). These triangular faces 230 form a square based pyramid with the pyramid tip at the earth's center and the pyramid's base defining the edges 228 of the spatial bin. While the bin edges 228 are formed by triangular faces 230, the surface of the earth at equal latitude and longitude is conical (see FIGS. 19C and 20).

Tracking and geofence system 200 tracks the position of vessels by means of position data points 232 that are transmitted by vessels at regular intervals. These position data points might comprise, e.g., automatic identification system (AIS) data. The position data points 232 have respective timestamps 238 so that tracking and geofence system 200 knows when a vessel was at a particular location.

A sequence of position data points 232 with respective associated timestamps 238 define a path of a vessel in four-dimension hyperspace, with time serving as the fourth dimension. Tracking and geofence system 200 generates a simplified four-dimensional hyperspace path 240 from these position data points 232 by applying the Ramer-Douglas-Peucker algorithm to filter out points that do not provide significant information regarding the path of the vessel (see FIGS. 5-7). The simplified 4D hyperspace path has an associated hyperspace tolerance radius 242 that is used to filter trivial changes in the vessel path (see FIG. 8). The hyperspace tolerance radius 242 comprises a positional tolerance 244. Time scaling coefficients 246 can be applied to the positional tolerance to maintain a constant tolerance width 248 across different speeds of the vessel (see FIGS. 10 and 11).

Tracking and geofence system 200 might employ a lookup-optimized data structure 250, which comprises a number of key values 252. Each key value 254 has associated edges 256, which may belong to but to not necessarily constitute a closed geofence area 204, and an associated spatial bin 258. When position data points 232 for a vessel are received, such as origin coordinates 234 and destination coordinates 236, the vessel path segment can be translated into two key values 252 (one for the start, and one for the end) which are used to retrieve the associated geofence edges within the associated spatial bin 258 that maps to those key values in the lookup-optimized data structure 250 (see FIG. 18B).

Tracking and geofence system 200 can be implemented in software, hardware, firmware, or a combination thereof. When software is used, the operations performed by tracking and geofence system 200 can be implemented in program code configured to run on hardware, such as a processor unit. When firmware is used, the operations performed by tracking and geofence system 200 can be implemented in program code and data and stored in persistent memory to run on a processor unit. When hardware is employed, the hardware can include circuits that operate to perform the operations in tracking and geofence system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 260 is a physical hardware system and includes one or more data processing systems. When more than one data processing system is present in computer system 260, those data processing systems are in communication with each other using a communications medium. The communications medium can be a network. The data processing systems can be selected from at least one of a computer, a server computer, a tablet computer, or some other suitable data processing system.

As depicted, computer system 260 includes a number of processor units 262 that are capable of executing program code 264 implementing processes in the illustrative examples. As used herein, a processor unit in the number of processor units 262 is a hardware device and is comprised of hardware circuits such as those on an integrated circuit that respond and process instructions and program code that operate a computer. When a number of processor units 262 execute program code 264 for a process, the number of processor units 262 is one or more processor units that can be on the same computer or on different computers. In other words, the process can be distributed between processor units on the same or different computers in a computer system. Further, the number of processor units 262 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
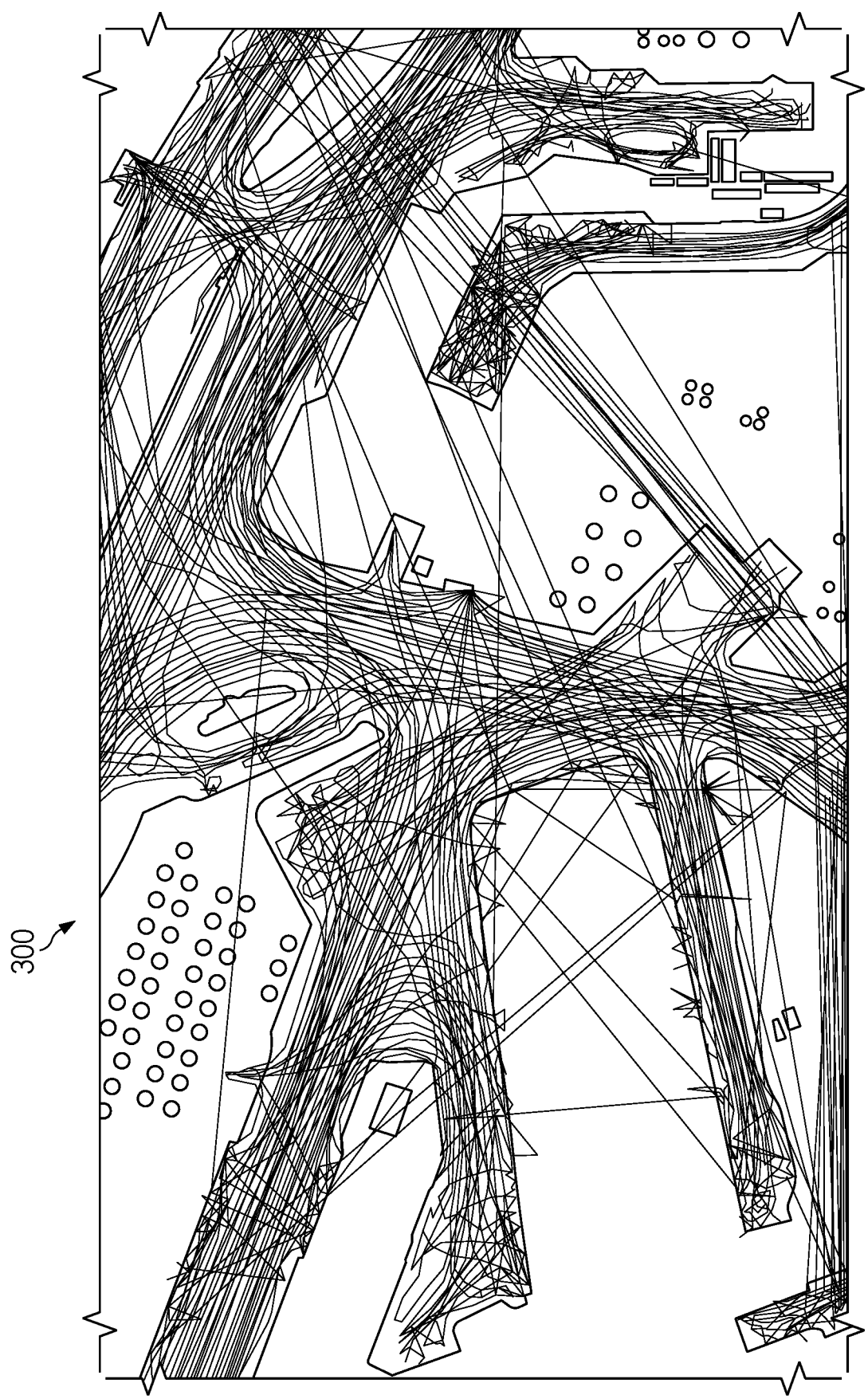
FIG. 3 depicts a pictorial diagram illustrating a stream of automatic identification system (AIS) data from a number of sources.

FIG. 3 depicts a pictorial diagram illustrating a stream of automatic identification system (AIS) data from a number of sources. Map 300 displays a multitude of tracks indicating the paths of maritime vessels within a particular geographic region. The example shown in FIG. 3 depicts a snapshot of maritime traffic around the port of Rotterdam. The volume of data traffic involved in tracking large numbers of vessels places a significant burden on the communications infrastructure, especially when one considers that the information is being transmitted and tracked in real time.

Figure 4:
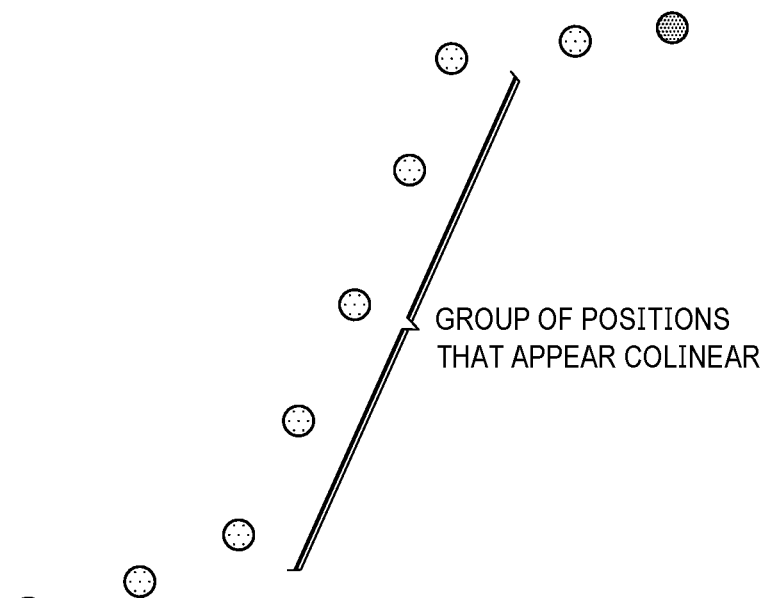
FIG. 4 illustrates a number of data points representing positional updates of a vessel.

FIG. 4 illustrates a number of data points representing positional updates of a vessel. As mentioned above, maritime vessels tend to travel in slow turning and predictable paths through time and space. As a result, many position update points are approximately colinear, as indicated in FIG. 4.

Figure 5:
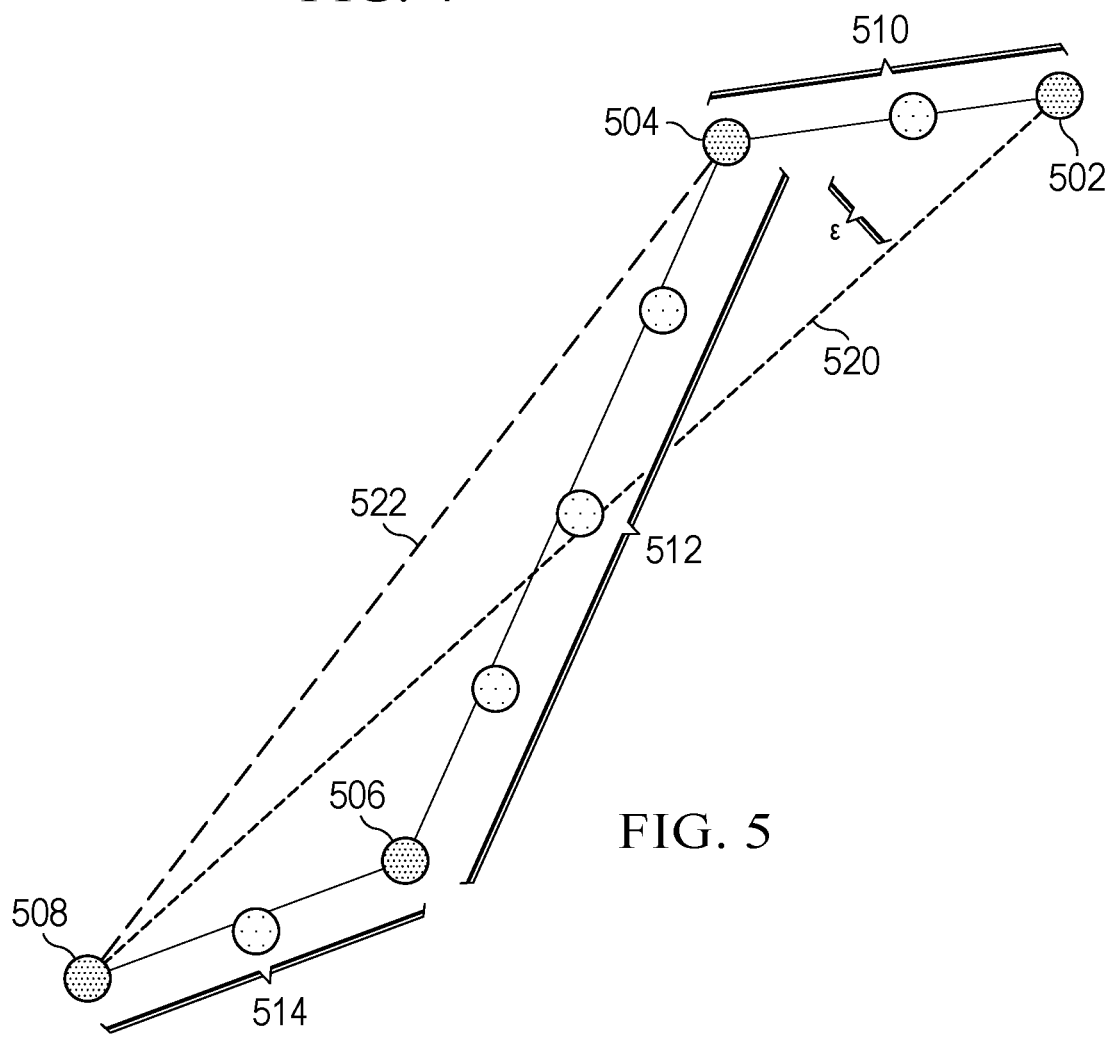
FIG. 5 illustrates lines segments calculated from position update data points in accordance with an illustrative embodiment.

FIG. 5 illustrates lines segments calculated from position update data points in accordance with an illustrative embodiment. In this example, the Ramer-Douglas-Peucker (RDP) algorithm is used to simplify the path described by the position points by identifying degenerate data. The RDP algorithm begins by drawing a line 520 between the start point 502 and end point 508 of a path, and then identifies the furthest point from that line, which in the present example is point 504. The RDP algorithm then subdivides line 520 using this furthest point 504, resulting in two new line segments 510 and 522. The RDP algorithm then repeats the process and determines the point furthest from line 522, which in the present example is point 506. Again, line 522 is subdivided using this furthest point 506, resulting in new line segments 512 and 514.

This process of line simplification continues recursively until the furthest point for all line segments is within a specified threshold distance $\varepsilon$ from the line segments. Without this threshold distance the simplification process would simply continue until arriving at the original series of data points. Therefore, a given subgroup of data points within the threshold distance $\varepsilon$ are close enough to be treated as a single line segment and can be discarded.

The RDP simplification algorithm was developed for cartographic generalization of geometries in two dimensions and as explained above, current standards for geospatial analysis such as GDAL treat similar simplification and intersection detection problems two-dimensionally. As a result, dateline wrapping issues and/or polar distortions become problematic and implementing corrections and edge-case handling prove extremely challenging and computationally expensive. However, the RDP algorithm does not inherently depend on the 2D nature of the original application and can be generalized to three dimensions using a three-dimensional geometric solution for line-point distance. Therefore, the line-point calculations from the two-dimensional simplification shown in FIG. 5 can be updated for 3D. The illustrative embodiments further generalize the RDP algorithm into four-dimensional hyperspace wherein positions are converted from 2D polar coordinates to Cartesian XYZ coordinates for position on a sphere in 3D space (see FIGS. 15A and 15B), with the timestamp of the position update point comprising the fourth dimensional coordinate.

Figure 6:
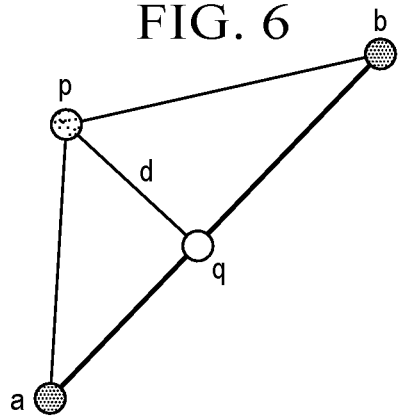
FIG. 6 illustrates the calculation of line-point distances between N-dimensional points in accordance with an illustrative embodiment.

FIG. 6 illustrates the calculation of line-point distances between N-dimensional points in accordance with an illustrative embodiment. In the present example, N is 4, wherein each point represents a point in three-dimensional space at a point in time (X,Y,Z,T).

For a given line segment $\vec{ab}$ between space-time point a and space-time point b the illustrative embodiments can calculate the perpendicular hyperdistance d of a point p from line $\vec{ab}$ by finding the point q representing the point on line $\vec{ab}$ that is closet to point p and then finding the hyperdistance between point p and q via the dimensionally generalizable Euclidean distance calculation. Line $\vec{ab}$ might represent, for example, the average speed of a vessel moving in a given direction. Point p might represent a deviation from that average speed (i.e., slowing down or speeding up) (see FIG. 7 below).

Point q along line segment $\vec{ab}$ can be found by parameterizing any given point along $\vec{ab}$ as:

$$q = a + k\vec{ab} \quad \text{(Eq. 1)}$$

where parameter k describing the traversal fraction along line segment $\vec{ab}$ can be found for the closet point q via the expression:

$$k = \frac{\vec{pa} \cdot \vec{ba}}{\|\vec{ba}\|} \quad \text{(Eq. 2)}$$

Perpendicular distance d can then be expressed:

$$d = \|\vec{pq}\| \quad \text{(Eq. 3)}$$

Figure 7:
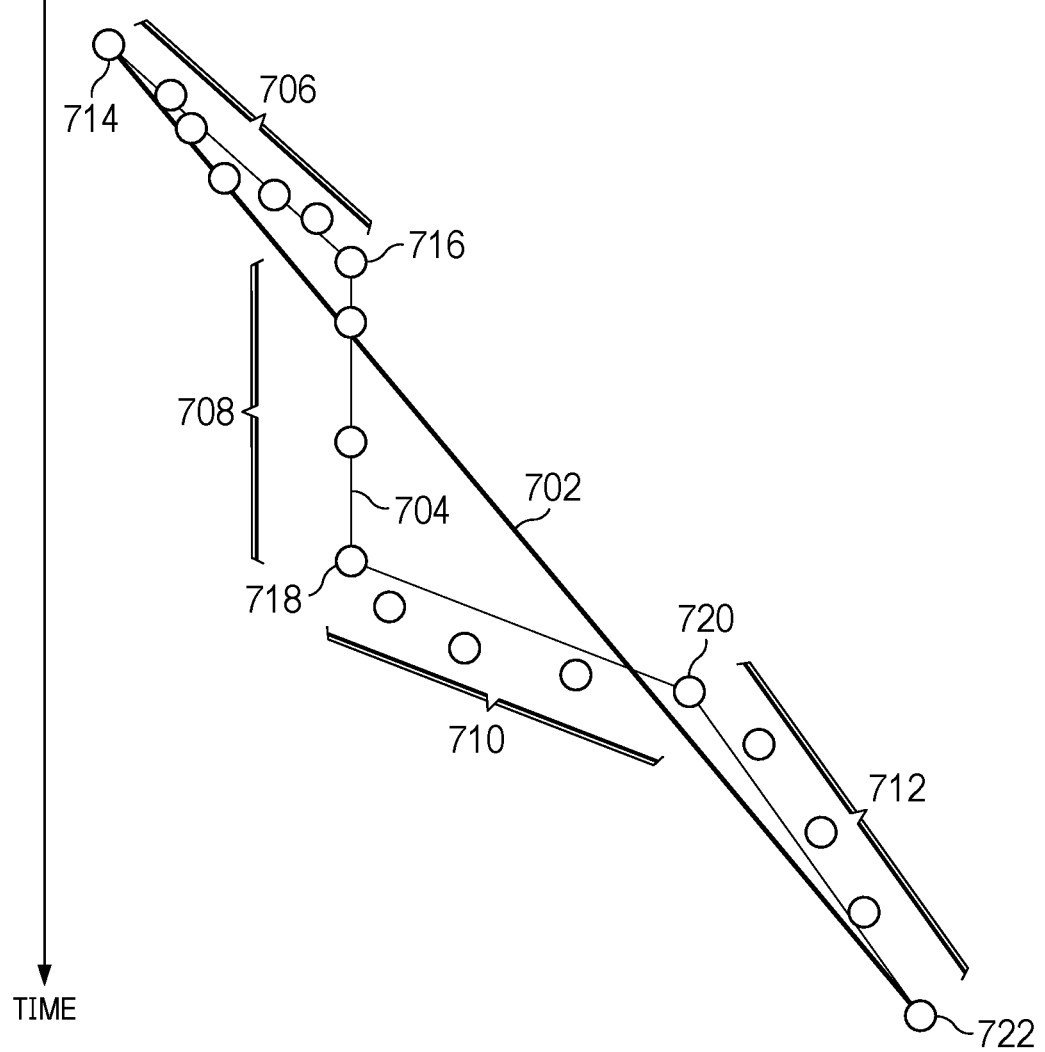
FIG. 7 depicts a diagram illustrating the relationship between spatial displacement and time for vessel in accordance with an illustrative embodiment.

FIG. 7 depicts a diagram illustrating the relationship between spatial displacement and time for vessel in accordance with an illustrative embodiment. Chart 700 can be viewed as a 4D chart in which the horizontal axis represents position in 3D Cartesian XYZ coordinates with respect to an arbitrary direction, and the vertical axis represents time.

For ease of illustration center line 702 represents a hypothetical straight path of a vessel traveling at constant speed in the (1,1,1) direction through 3D space. Merely noting the position of the vessel in Cartesian coordinates according to the RDP simplification does not account for vessel speed. By adding the vertical time axis, chart 700 visualizes changes in displacement over time (i.e., speed). Since center line 702 represents a straight path at constant speed, deviations from center line 702 represents a vessel maintaining the same heading, but overtaking, falling behind, and then catching up with the average speed of center line 702.

Line 704 represents the actual path of a vessel over time as calculated according to the RDP line simplification algorithm described above but now adding the fourth dimension of time to the 3D Cartesian XYZ coordinates. Each change in the slope of line 704 represents changes in speed of the vessel. Durations where line 704 is above center line 702 represent durations in which the vessel is ahead of the average speed. Durations where line 704 is below center line 702 represent durations where the vessel is behind the average speed. Line segment 706 represents the vessel underway with a relatively low speed as it approaches a port at inflection point 716 where it remains stationary before departing later, shown at inflection point 718. In the case of line segment 708, the data points do not change in position as time increases, which indicates the vessel is stationary (e.g., anchored at port). After leaving port, the vessel accelerates to a high speed, represented by line segment 710, before decelerating to a medium cruising speed represented by line segment 712.

In terms of reducing real-time data transmission burdens, the data of most interest is data that represents a change in the vessel's behavior. For example, in current AIS data handling, vessels will continue to transmit position updates at regular intervals while stationary at port, such as represented by line segment 708. Ideally, such position update data is redundant and not necessary. Additionally, vessels with steady headings and speeds are maintaining a constant behavior and therefore frequent positional updates are not necessary to describe this constant behavior. Treating time as a vector dimension in this simplification approach allows for changes in vessel behavior such as change in speed to be represented in the simplified output even if the vessel's direction of travel remains unchanged.

Figure 8:
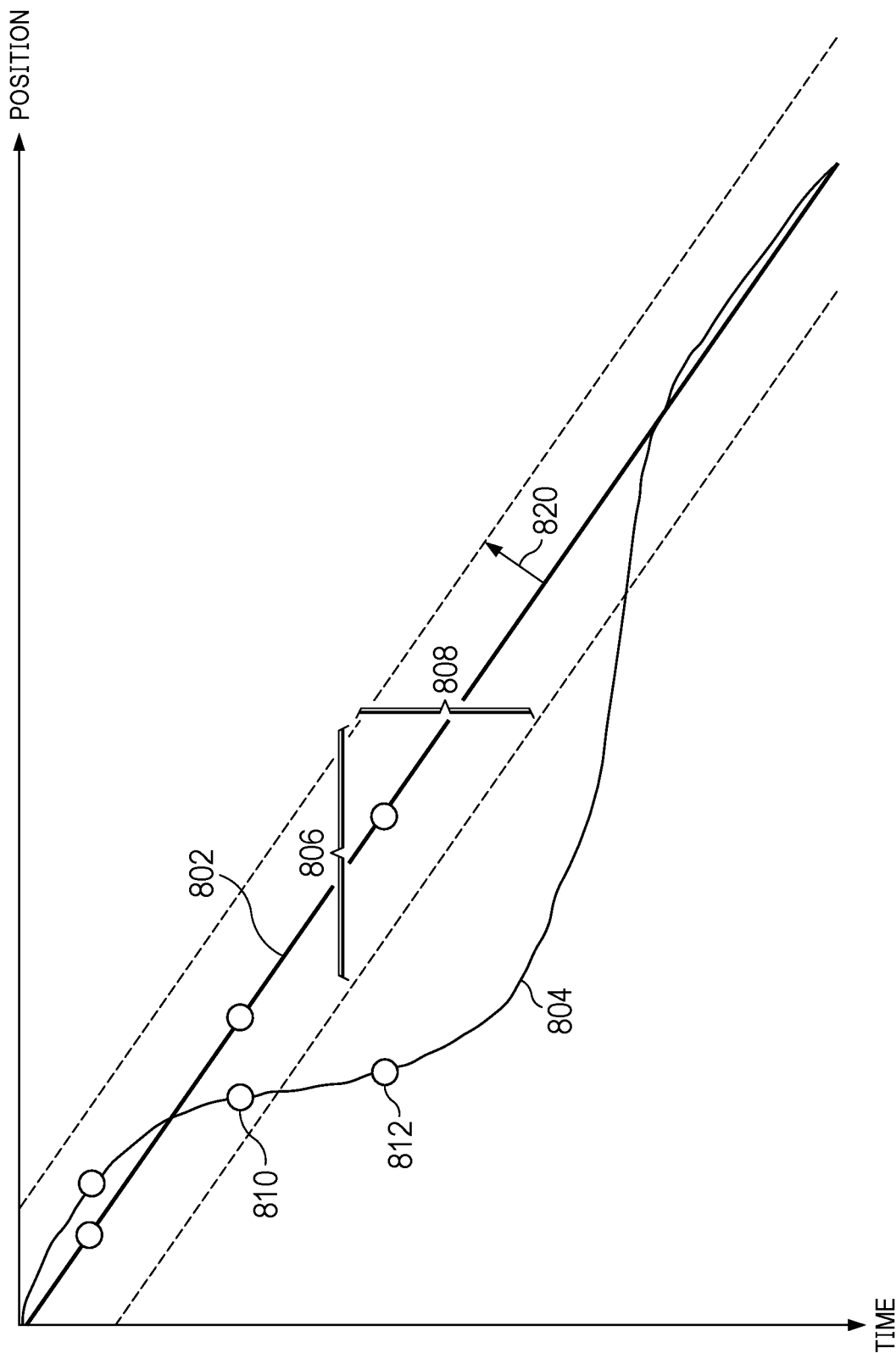
FIG. 8 depicts a diagram illustrating time scaling in tracking vessel movements in accordance with an illustrative embodiment.

When combining spatial and temporal units in a 4D vector space, a scaling relationship between units is necessary for the geometric conclusions in hyperspace to be physically meaningful. FIG. 8 depicts a diagram illustrating time scaling in tracking vessel movements in accordance with an illustrative embodiment. For center line 802 representing average speed, there is a positional tolerance 806 along the horizontal position axis and a velocity dependent time tolerance 708 along the vertical time axis that together represent a "radius" 820 within which data points do not represent a deviation from the current/previous status and therefore are not noteworthy. Tolerance radius 820 is the hyperspace equivalent of threshold distance ε shown in FIG. 5. For any given time, the goal is to determine whether the vessel position point is within this tolerance radius 820 of the interpolated point for that line segment.

In the present example, point 810 on line 804 representing the actual path of the vessel falls within the tolerance radius 820 of line segment 802 and can be considered an inconsequential change in speed of the vessel. However, as time increases with little change in position, the resulting position point 812 at the next update now falls outside the tolerance radius 820, representing the vessel approaching a stop. Therefore, in order to stay within the tolerance radius 820, the vessel in question must maintain average speed to avoid breaching the threshold. Stated differently, for a given value of time, the vessel must not breach the distance threshold from the average path 802 at that time.

Referring back to FIG. 7, inflection points 714, 716, 718, 720, 722 along line 704 marking the transition between line segments 706, 708, 710, 712 represent the points of interest. The data points along the line segments between the inflection points 714, 716, 718, 720, 722 do not provide any new information regarding the status of the vessel and ideally can be ignored. For example, in tracking the positional data points in real-time there is not a clear differentiation between vessels that are stationary versus moving very slowly. If the tolerance radius against the projected path is not violated, the data points are ignored. It is only after the position has remained unchanged long enough to violate the tolerance radius that the vessel's average speed is reclassified as being much slower.

Figure 9:
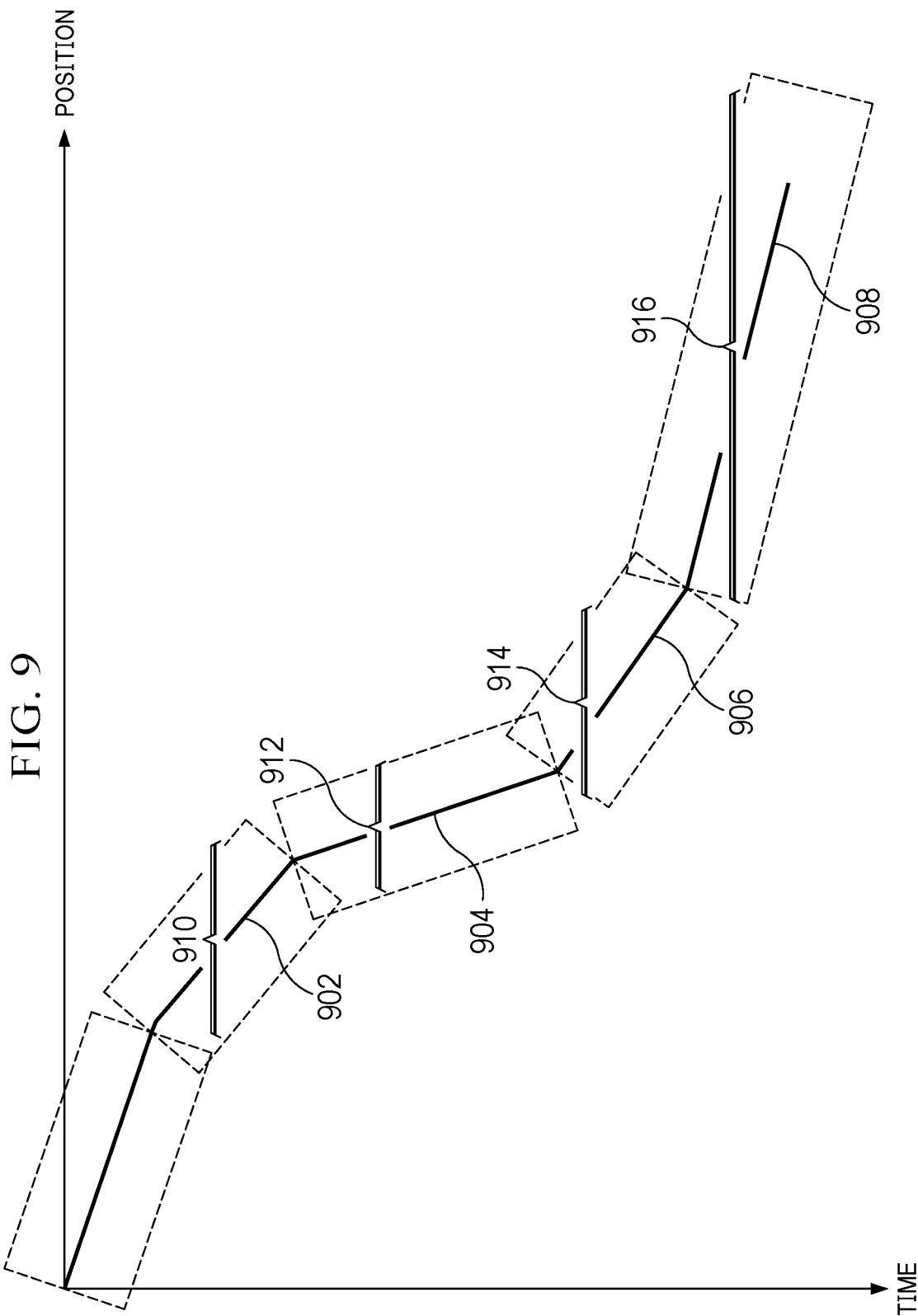
FIG. 9 depicts a diagram illustrating speed dependence of time scaling.

FIG. 9 depicts a diagram illustrating speed dependence of time scaling. A curious phenomenon of time scaling is that when using perpendicular hyperdistance as a proximity criterion, the positional tolerance depends on the speed of the vessel. As shown in the example in FIG. 9, the positional tolerances 910, 912, 914, 916, along the horizontal position axis varies with the speed (slope) of the respective line segments 902, 904, 906, 908. As a result of this variability, vessel movements that should fall outside the tolerance radius do not.

The overcome the issue of speed-dependent positional tolerance, the illustrative embodiments utilize a time scaling ("squashing") coefficient to keep positional tolerance constant.

Figure 10:
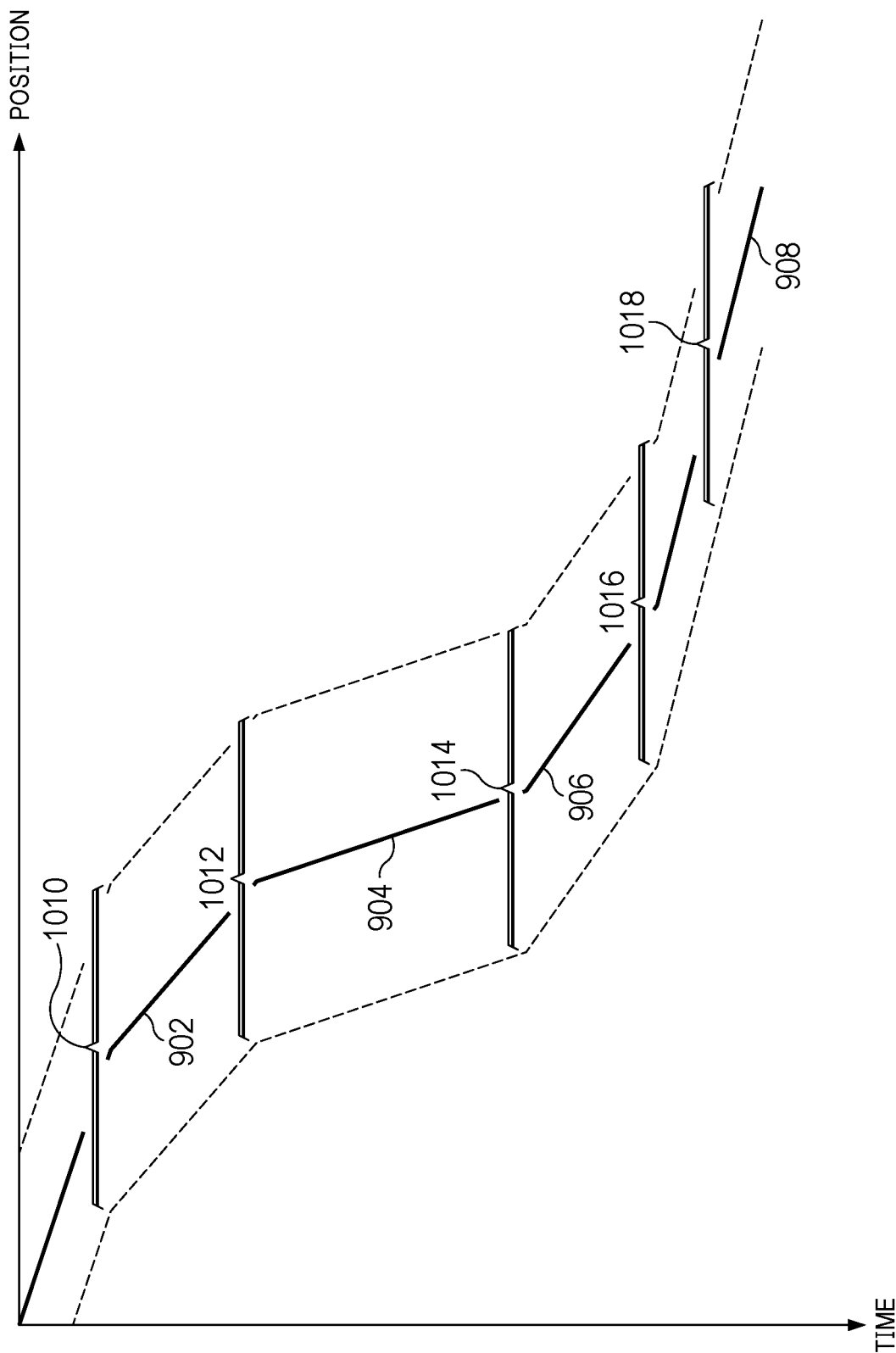
FIG. 10 depicts a diagram illustrating time scaling with position tolerance correction in accordance with an illustrative embodiment.

FIG. 10 depicts a diagram illustrating time scaling with position tolerance correction in accordance with an illustrative embodiment. In this example, time scaling coefficients are applied to the line segments 902, 904, 906, 908 shown in FIG. 9. However, because of the time scaling coefficients, the positional tolerances 1010, 1012, 1014, 1016, 1018 for each segment are identical in width despite the changes in vessel speed from line segment to line segment.

The time scaling coefficient (tsc) is expressed:

$$tsc = \frac{t \cdot v}{|t||v|} \quad \text{(Eq. 4)}$$

where t is unit vector of time and v is velocity.

In the four-dimensional case, the goal is to evaluate whether the distance d is greater than the specified threshold, where (from Eq. 3) d is expressed as:

$$d = \|\vec{pq}\|$$

The time scaling coefficient can be applied to $\vec{pq}$ as a scaling matrix:

$$j = \begin{bmatrix} 1 & 0 & 0 & 0 \\ 0 & 1 & 0 & 0 \\ 0 & 0 & 1 & 0 \\ 0 & 0 & 0 & 1/tsc \end{bmatrix} * \vec{pq} \quad \text{(Eq. 5)}$$

then $$d = \|j\| \quad \text{(Eq. 6)}$$

Figure 11:
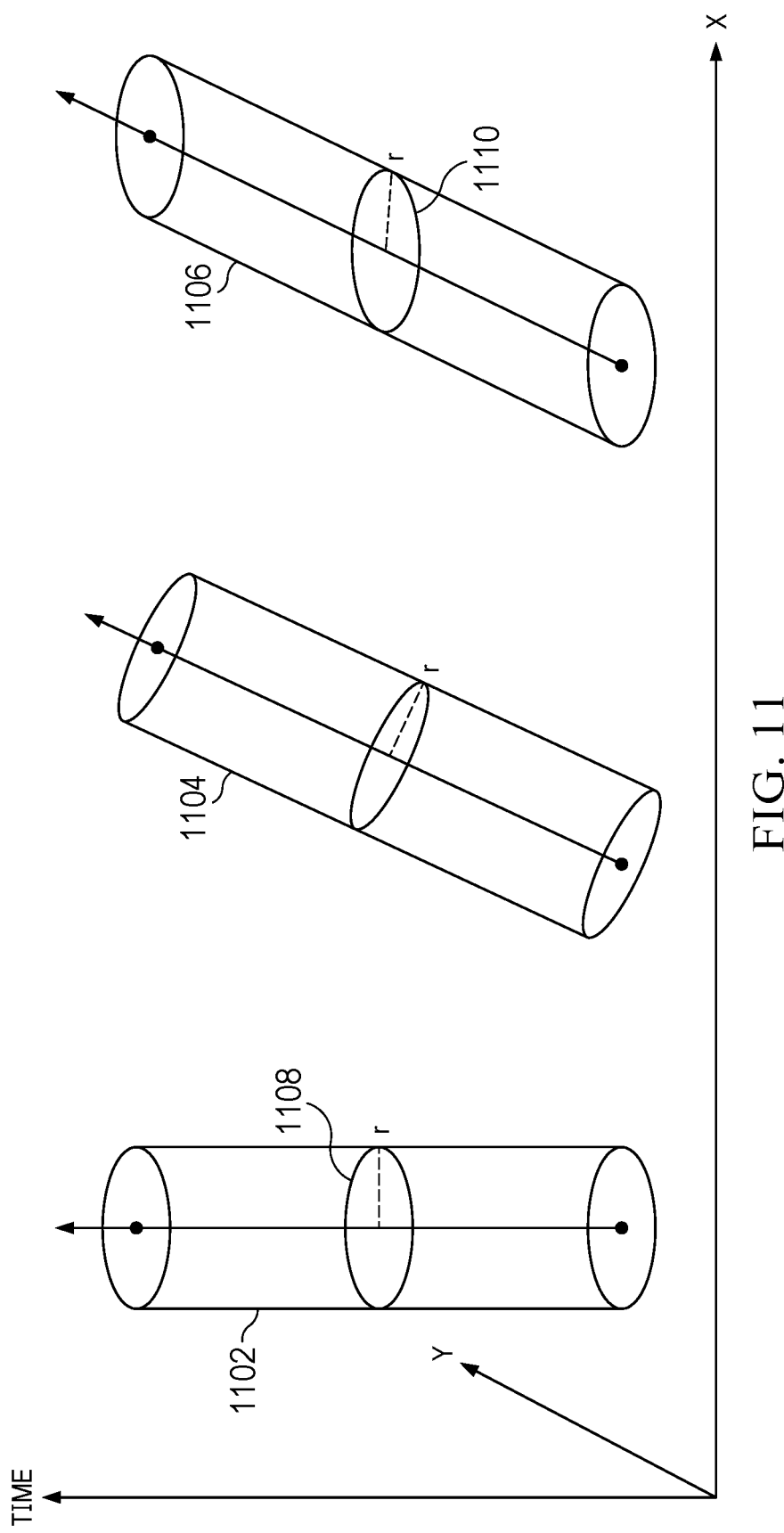
FIG. 11 depicts a diagram illustrating a cylinder representing a spatial threshold around the path of a vessel in accordance with an illustrative embodiment.

FIG. 11 depicts a diagram illustrating a cylinder representing a spatial threshold around the path of a vessel in accordance with an illustrative embodiment. The cylinders 1102, 1104, 1106 are representations of the tolerance radius r around the velocity vector of the vessel under different conditions. The velocity vector is representative of a line segment such as those shown in FIGS. 9 and 10.

Cylinder 1102 is an example of a spatial threshold around an entity at rest. Similar to line segment 704 in FIG. 7, the position in space (along the X and Y axes) does not change as time increases (i.e., the vessel travels only through time but not space).

Cylinder 1104 represents a spatial threshold around a moving vessel (e.g., moving in the 1,1,1 direction), forming a cylinder aligned with the velocity vector. The tilt of cylinder 1104 represents movement through space and time since the position changes along the X and Y axes as time increases. Ideally, for an X-Y-Z-Time 4D segment, the spatial tolerances should be spherical, centered around linear traversal of the space-time segment. This spherical tolerance would be analogous to a circular cross section in the X-Y plane such as cross-section 1108. However, this goal is not achievable with the basic hypercylinder axially aligned with the velocity vector as shown in cylinder 1104.

For a moving vessel, the desired result is an obliquely scaled perpendicular hyperdistance from an oblique hypercylinder surface, as illustrated by cross-section 1110 in cylinder 1106. To achieve this result a linear transformation is applied to the geometry of cylinder 1104 to shift the coordinate system into a squashed (scaled) representation to achieve the needed obliqueness. This transformation is achieved by applying the scaling matrix in Eq. 5 above to all coordinates before finding the hyperdistance.

Figure 12:
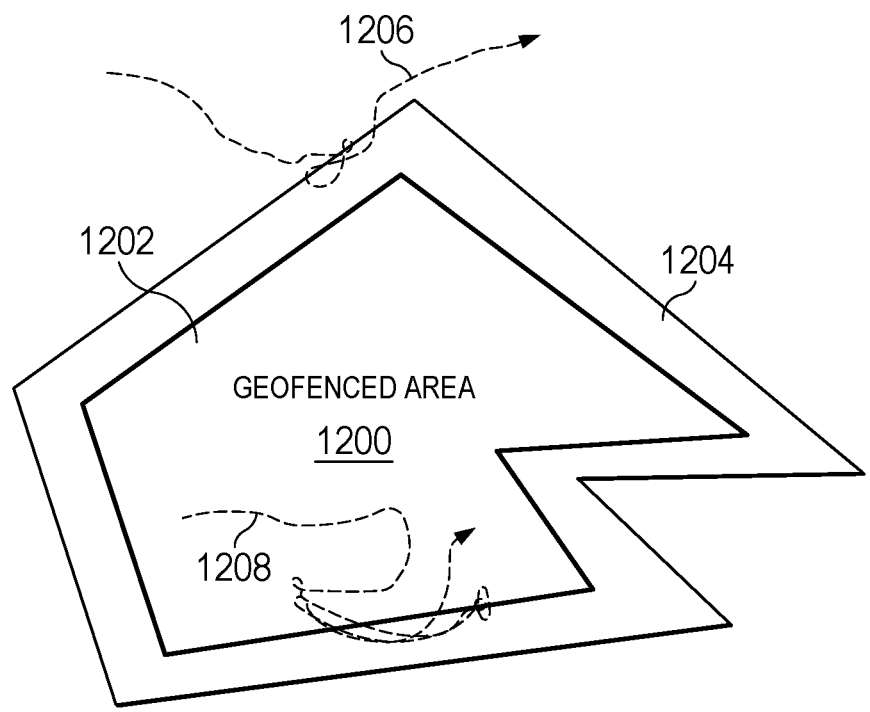
FIG. 12 depicts a diagram illustrating a geofenced area in accordance with an illustrative embodiment.

FIG. 12 depicts a diagram illustrating a geofenced area in accordance with an illustrative embodiment. Geofenced area 1200 might be, for example, a port zone that is defined by an inner boundary 1202. Surrounding the geofenced area 1200 is an outer buffer zone 1204 that approximately matches the outline of the inner boundary 1202 expanded by a configurable tolerance.

Lines 1206 and 1208 comprise position updates representing the paths of vessels in and around geofenced area 1200. As shown in FIG. 12, the vessels may exhibit repetitive localized movements while station keeping, as shown by line 1206, or while swinging at anchor due to tidal currents, as shown by line 1208. This myriad of small adjustments is typical vessel behavior around ports and might be referred to as "jitter". If such jitter occurs in proximity to the inner boundary 1202 of the geofenced area 1200, it can generate multiple geofence alerts. However, these multiple geofence alerts give a false impression of the vessel's true course and unnecessarily use up bandwidth and computational resources for what are essentially false positives.

Building upon the idea described above of ignoring data points that do not provide any new information about the path of the vessel, the illustrative embodiments down sample to ignore movements across the inner boundary 1202 and buffer zone 1204 of geofenced area 1200 that do not represent true ingress or egress from the geofenced area 1200.

The use of outer buffer zone 1204 helps filter jitter from triggering false geofence alerts. Only an ingress that crosses both the outer buffer zone 1204 and inner boundary 1202 of geofenced area 1200 would represent a true ingress of the vessel into the geofenced area. Conversely, only an egress through both the inner boundary 1202 and outer buffer zone 1204 would represent a true egress from the geofenced area 1200.

In the example shown in FIG. 12, line 1206 does not represent a true ingress into geofenced area 1200 because the vessel only crosses into the outer buffer zone 1204 and never crosses inner boundary 1202. By the same token, the vessel path represented by line 1208 is not considered a true egress from geofenced area 1200 because the jitter only crosses the inner boundary 1202 and never crosses completely through outer buffer zone 1204. Therefore, the illustrative embodiments would ignore both lines 1206 and 1208.

Figure 13:
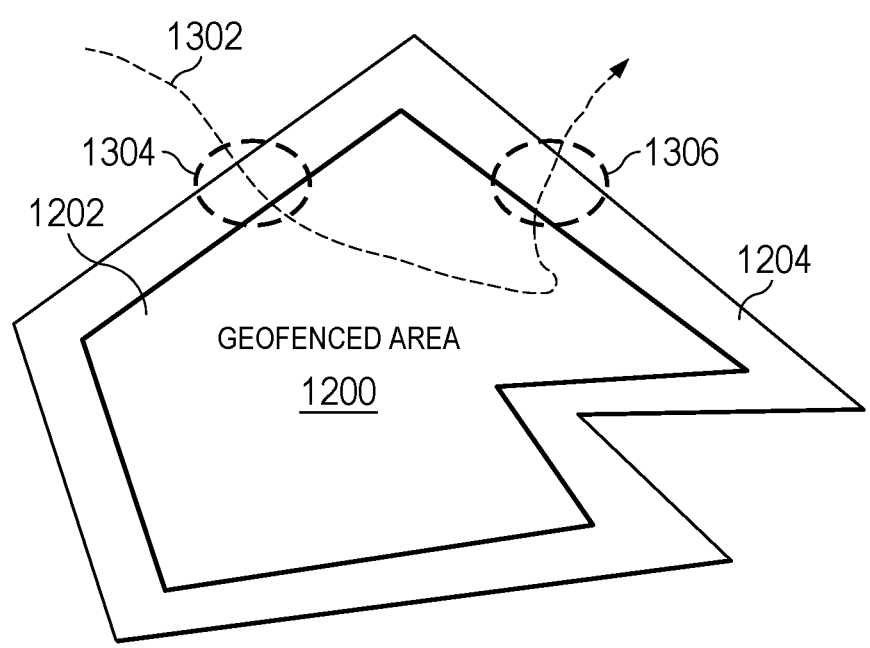
FIG. 13 depicts a diagram illustrating high level geofence entry/exit detection in accordance with an illustrative embodiment.

FIG. 13 depicts a diagram illustrating high level geofence entry/exit detection in accordance with an illustrative embodiment. In contrast to lines 1206 and 1208 in FIG. 12, line 1302 represents a true ingress and egress through geofenced area 1200. At entry event 1304, the vessel's path represented by line 1302 crosses through the outer buffer zone 1204 and crosses inner boundary 1202. By satisfying both conditions, the entry event would trigger a geofence alert. Similarly, at exit event 1306 the vessel crosses inner boundary 1202 then passes completely through the outer buffer zone 1204. Again, by satisfying both egress conditions, the exit event 1306 would trigger a geofence alert.

Figure 14:
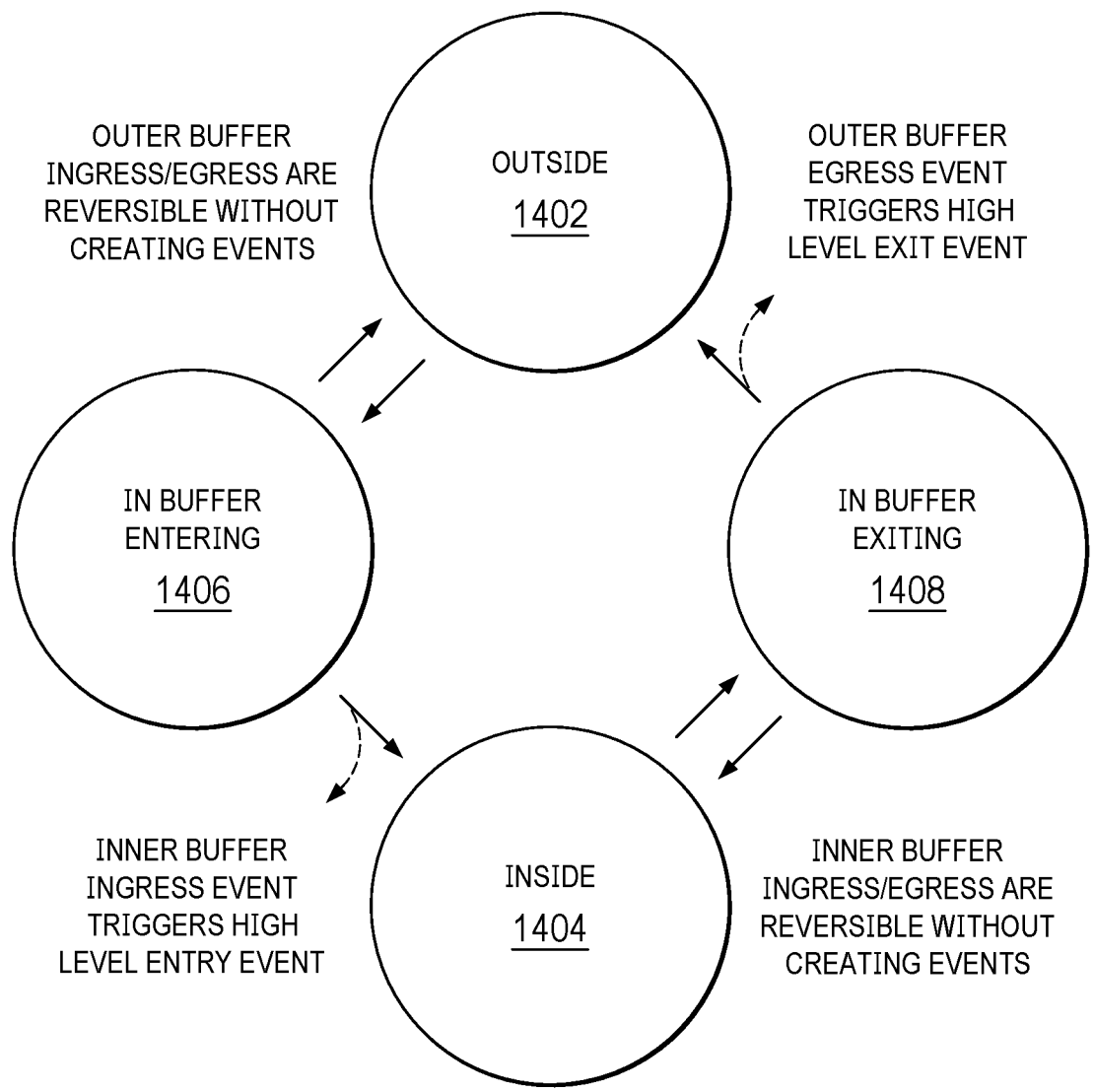
FIG. 14 depicts a diagram illustrating the different states of geofence ingress and egress in accordance with an illustrative embodiment.

FIG. 14 depicts a diagram illustrating the different states of geofence ingress and egress in accordance with an illustrative embodiment. A vessel can be in one of four states in relation to a geofenced area. These states comprise outside 1402, inside 1404, in buffer entering 1406, and in buffer exiting 1408.

Transitions between the outside state 1402 and in buffer entering state 1406 are reversible without triggering a geofence event. When the vessel transitions from the in buffer entering state 1406 to the inside state 1404, it triggers a high-level entry event.

Similarly, transitions between the inside state 1404 and in buffer exiting state 1408 are also reversible without triggering a geofence event. When the vessel transitions from the in buffer exiting state 1408 to the outside state 1402, it triggers a high-level exit event.

The presence of buffer zones around adjacent geofenced areas opens the possibility of a vessel being considered as being in two zones at once. The buffers allow one to treat the position of a vessel at any time as a probability instead of an entirely reliable position due to tolerances on GPS accuracy. If that probability is down the middle of two adjacent zones, the illustrative embodiments can accommodate it as being in both zones simultaneously even though the inner boundaries do not overlap. For example, in a shipyard, interfering factors such as the presence of many flat metal surfaces and arc welding can produce considerable radio noise that reduces the accuracy and reliability of GPS signals. The buffer zones help to accommodate such confounding factors in determining the position of vessels within zones.

The discussion thus far has presented vessel movements and geofencing as occurring in a two-dimensional plane. However, it must be kept in mind that the vessels are in fact moving in arcs over the earth's surface. Furthermore, geofenced zones may cover large areas exceeding 10° of longitude or latitude where spherical distortions will be significant.

Figure 15A:
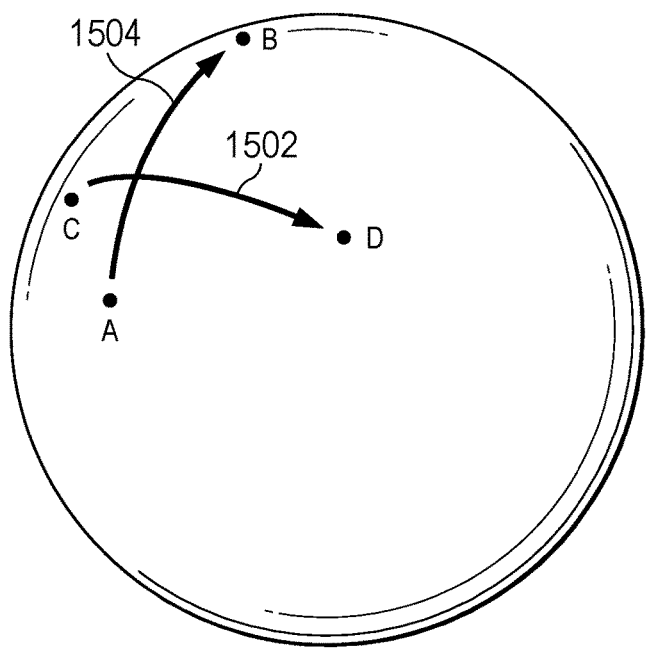
FIG. 15A depicts great arcs being evaluated for intersection in accordance with an illustrative embodiment.
Figure 15B:
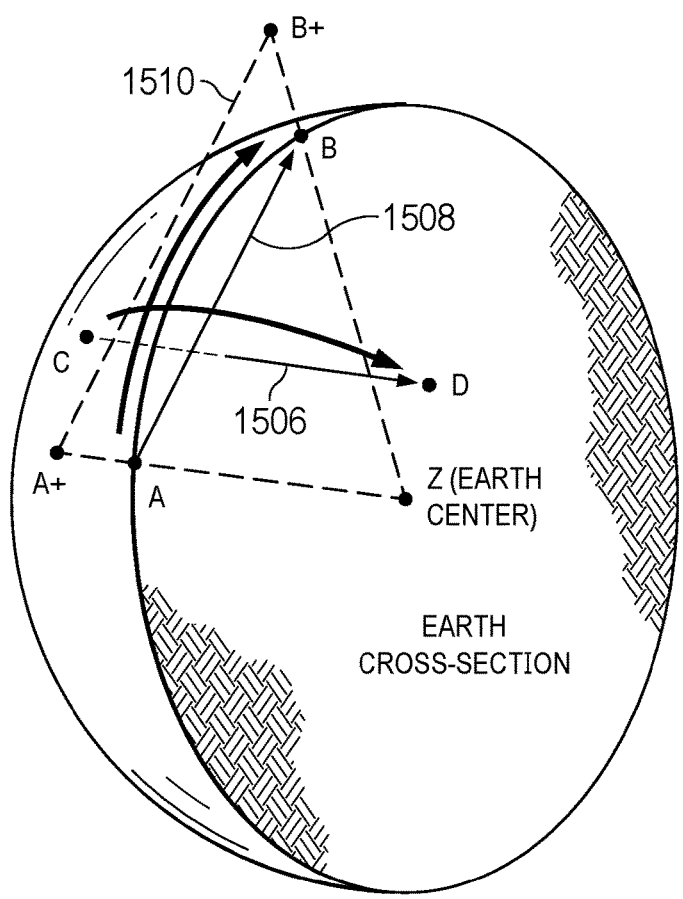
FIG. 15B illustrates an equivalent geometric construction to test for intersection of vessel path with a geofence edge in accordance with an illustrative embodiment.

FIGS. 15A and 15B depict diagrams illustrating predicting the intersection of vessel paths with geofence boundaries. FIG. 15A depicts great arcs being evaluated for intersection in accordance with an illustrative embodiment. In the present example, great arc C→D 1502 represents the path of a vessel over the earth's surface from start (origin) coordinates C to end (destination) coordinates D. End coordinates D typically comprise the most recent update received from the vessel. Great arc A→B 1504 represents an edge of a geofence. The illustrative embodiments determine whether the great arc 1502 of the vessel path has intersected the great arc 1504 of the geofence edge. A geofence break can be defined as an intersection of these two arcs.

FIG. 15B illustrates an equivalent geometric construction to test for intersection of vessel path with a geofence edge in accordance with an illustrative embodiment. In this view, the 3D C→D vector 1506 represents great arc 1502 when projected to the sphere surface. Similarly, the 3D A→B vector 1508 represents great arc 1504 when projected to the sphere surface.

FIG. 15B depicts the construction of a triangle 1510 using points A+, B+, and Z (center of the earth) where A+ and B+ represent points A and B extended azimuthally such that the segment between A+ and B+ remains above the earth's surface at the segment midpoint. Any 3D vector that intersects this triangle 1510 describes a great arc intersection. In the present example, C→D vector 1506 intersects the plane of triangle 1510, indicating that the vessel's path will generate a geofence break.

FIG. 16 depicts the projection of a geofenced area onto the earth's surface. In this view, the geofenced area 1200 is shown in relation to a simple representation of the earth 1600 using lines of latitude and longitude. As illustrated, the edges of the geofenced area 1200 are depicted as triangular projections from the earth's center 1602 (shown more clearly in FIGS. 17A and 17B).

Figure 17B:
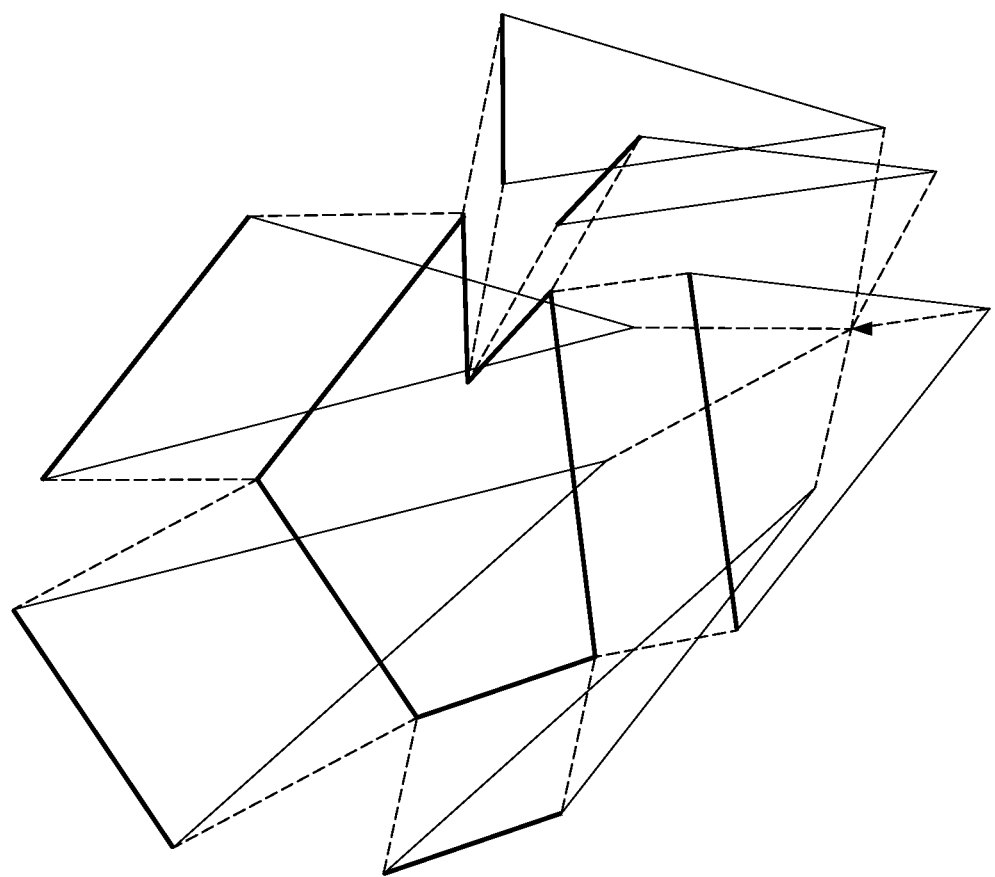
FIG. 17B depicts an exploded view of the geospatial volume in FIG. 17A.
Figure 17A:
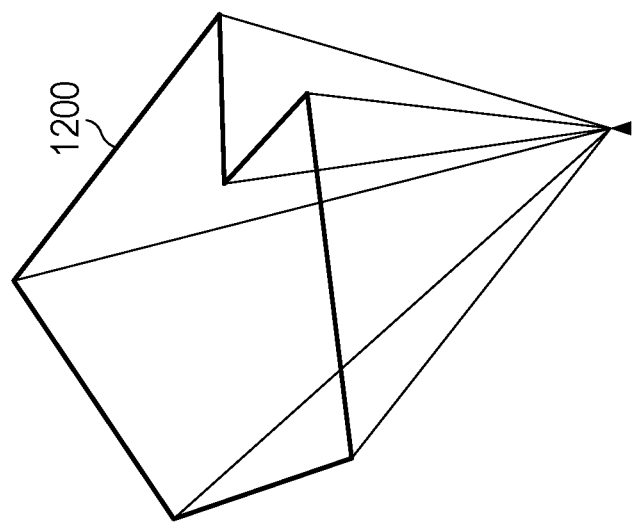
FIG. 17A depicts the geofenced area 1200 as a geospatial volume originating at the center of the earth in accordance with an illustrative embodiment.

FIG. 17A depicts the geofenced area 1200 as a geospatial volume originating at the center of the earth in accordance with an illustrative embodiment. FIG. 17B depicts an exploded view of this geospatial volume. As can be seen in these figures, the edges comprising the geofenced area 1200 can be represented by respective triangular projections from the earth's center similar to triangle 1510 in FIG. 15B.

Bandwidth requirements can be further reduced by limiting the number of geofence edges that have to be tested for each vessel path segment. This reduction can be accomplished with a lookup-optimized data structure designed to efficiently provide subsets of the total set of geofence edges based on their locality to the geometry of the vessel path segment being evaluated for intersections. By using this lookup-optimized data structure distant geofence edges do not need to be evaluated.

Figure 18A:
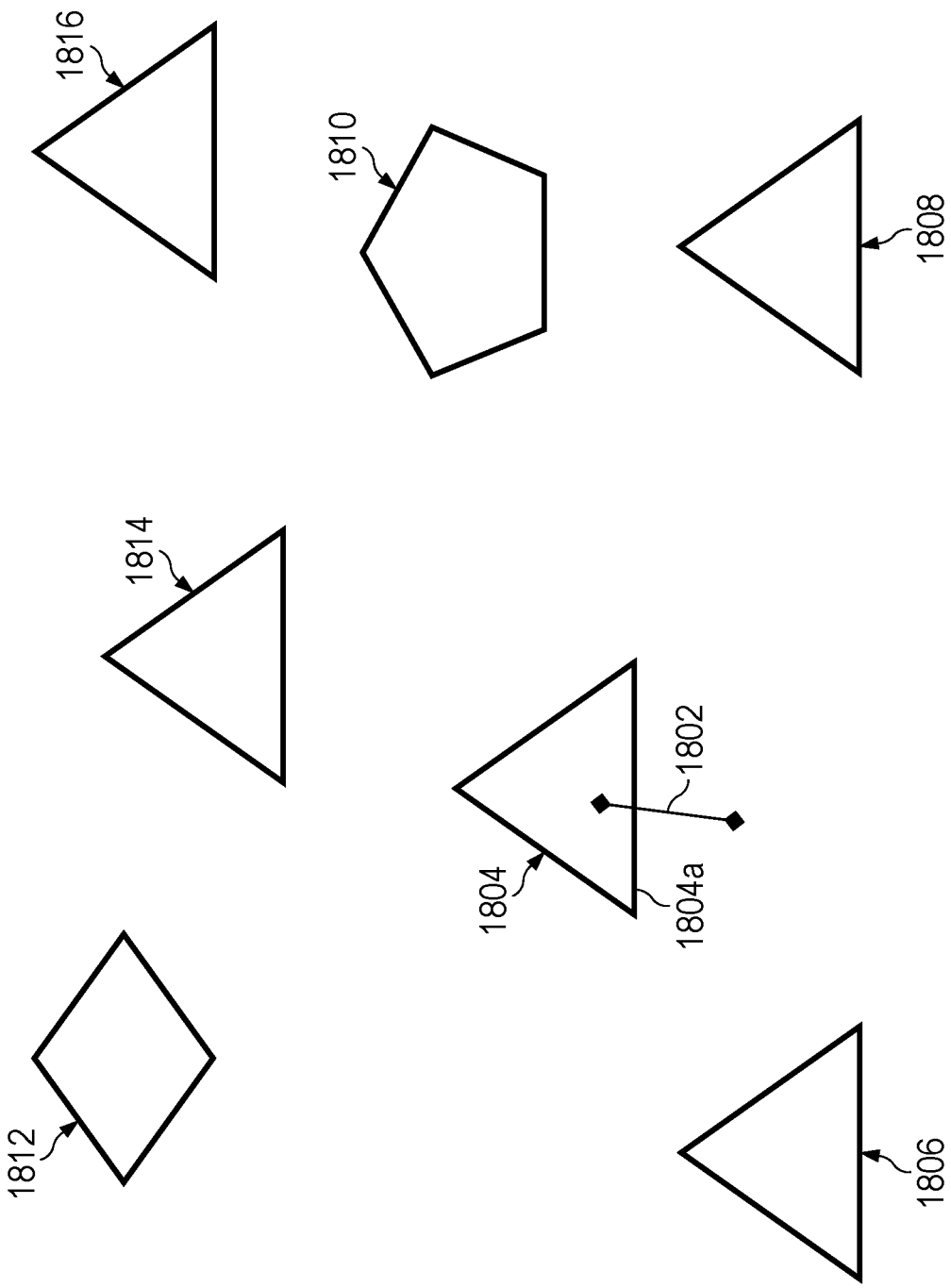
FIG. 18A depicts several geofenced areas stored in an unoptimized flat list.
Figure 18B:
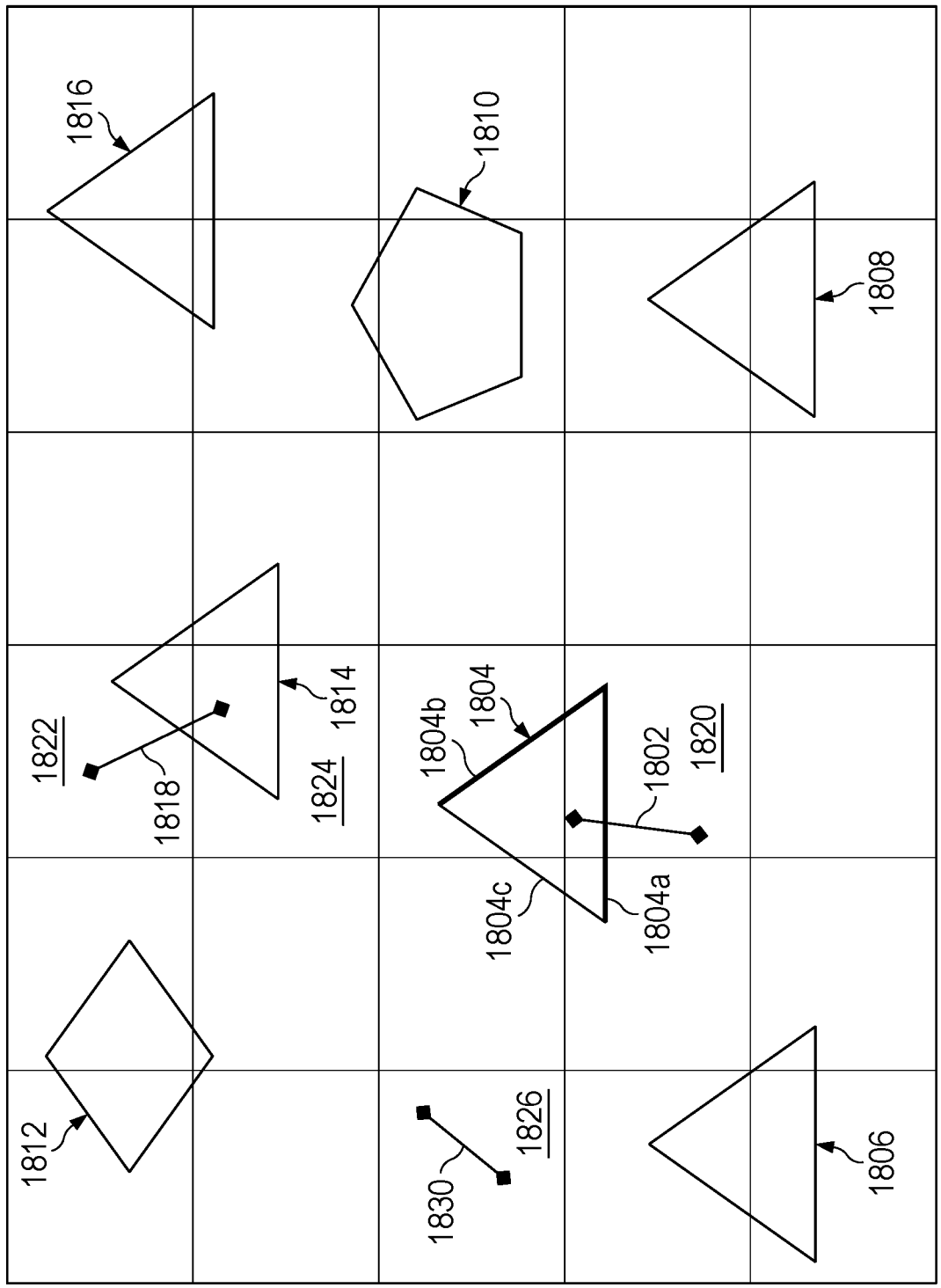
FIG. 18B depicts the application of spatial discretization and an associated lookup-optimized data structure to minimize the necessary geofence edge testing required to reliably detect a valid intersection in accordance with an illustrative embodiment.

FIGS. 18A and 18B illustrate the application of geographic binning in accordance with an illustrative embodiment. FIG. 18A depicts several geofenced areas stored in an unoptimized flat list. In this example, segment 1802 represents an incremental step in the path of a vessel, which can be seen to intersect edge 1804a of geofence area 1804. For a processing system to detect this intersection, the system must test all the edges of all geofenced areas 1804-1816 for intersection against segment 1802, which entails substantial processing resources when dealing with many millions of geofence edges.

FIG. 18B depicts the application of spatial discretization and an associated lookup-optimized data structure to minimize the necessary geofence edge testing required to reliably detect a valid intersection in accordance with an illustrative embodiment. In FIG. 18B space has been discretized arbitrarily into a grid of 30 spatial bins. A precomputation process is used to interpret the geometry of all geofences (1804-1816) and populate a lookup-optimized data structure comprised of sets of geofence edges grouped by their association with given spatial bins. Association here being defined by the presence of a geofence edge vertex within a spatial bin, or by the intersection of a geofence segment edge with the bounds of a given spatial bin. This detection of association is achieved by constructing a 3D binning mesh of the spatial discretization bounds and evaluating the edges of this mesh for intersections with geofence edge segments. It is common for geofence edges to be associated with multiple bins.

When evaluating an incremental step in the path of a vessel against a set of geofences the application of this lookup-optimized data structure enables a dramatic reduction in the number of geofence edges that need to be tested to reliably detect all potential intersections. If the origin and destination points of an incremental step in a vessel path are within a single spatial bin, only geofence edges associated with that bin need to be tested. For example, in FIG. 18B vessel path 1802 is contained entirely within geospatial bin 1820. Therefore, only geofence edges 1804*a* and 1804*b* (which the precomputation step previously associated with bin 1820 within the lookup-optimized data structure) are tested for intersection since they are the only geofence edges that partly or fully fall within spatial bin 1820. Geofence edge 1804*c* is not tested for intersection because no part of it falls within spatial bin 1820, even though it helps define geofenced area 1804. By the same token, none of the edges for the other geofenced areas 1806-1816 are tested since they do not fall within spatial bin 1820 and therefore are not associated with bin 1820.

In contrast, vessel path 1818 falls within two spatial bins 1822 and 1824 (i.e., the origin coordinates and destination coordinates are located in different respective spatial bins). In this case, because the vessel path 1818 falls within more than one geospatial bin, the system will test all geofence edges of all geofence areas 1804-1816. While such brute force testing of all geofence edges does require a substantial increase in computing resources, as a practical matter, only a small percentage of vessel traffic typically spans two spatial bins, making the need for such calculations relatively infrequent.

To rapidly retrieve relevant geofence edges for evaluation against an incremental step in a vessel path a spherical spatial discretization function is leveraged. This function has the mathematical property of reducing the coordinates of all points falling within a given spatial bin to a single shared identifying key value. A trivial example of such a spherical spatial discretization function would be to round the latitude and longitude of any given coordinate up to the nearest integer. This trivial example function would discretize the earth's surface into a grid of 68, 800 1-degree by 1-degree bins. An example identifying value might be "5202" (a combination of integers "52" and "2") shared by coordinates [51.985, 1.121], [51.488, 1.874], etc. This example spherical spatial discretization function represents a trivial computational expense but allows coordinates of a prospective vessel path segment to be trivially translated into a key value which can then be used to retrieve the geofence edges associated with the spatial bin that maps to that key value in a lookup-optimized data structure. Examples of lookup-optimized data structures may include an array accessed using a numerical key as an access index or alternatively a hash-map based data structure such as a dictionary.

The trivial example of a spherical spatial discretization function described above discretizes an area in two dimensions. However, when such a function is applied in three dimensions, there are subtle discrepancies between the 3D binning mesh used for precomputation of geofence edge-spatial bin associations and a spherical spatial discretization function that relies on rounding latitudes to their nearest multiple of a given constant (this constant being "1 degree" in the above example).

Figure 19A:
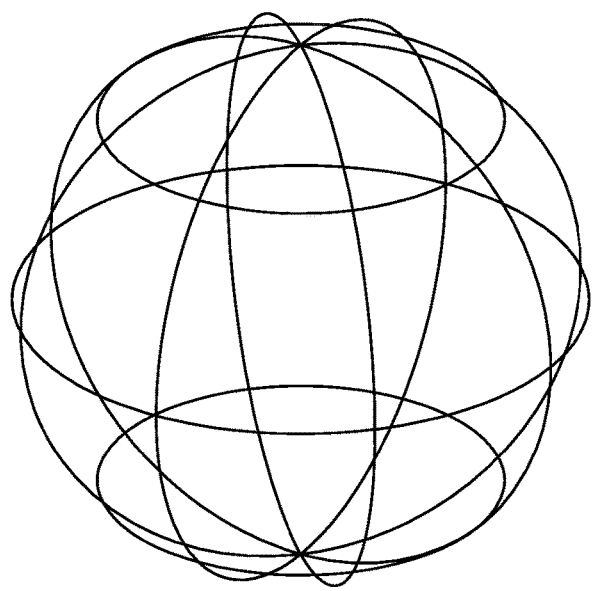
FIG. 19A illustrates simple spherical spatial discretization function's discretization of the earth's surface into discrete bins according to latitude and longitude.
Figure 19B:
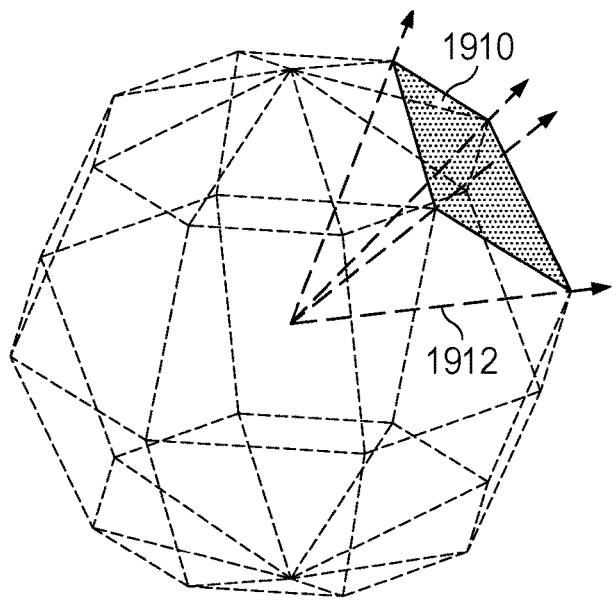
FIG. 19B illustrates 3D binning mesh geometry used to pre-compute geofence segment association with bins.
Figure 19C:
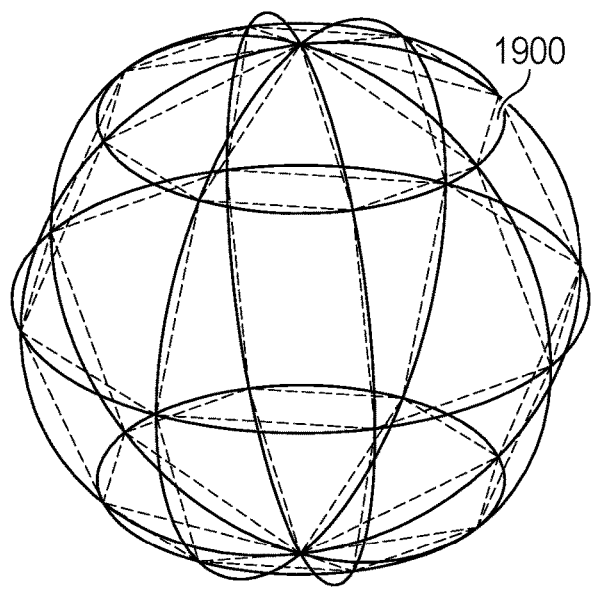
FIG. 19C depicts a diagram illustrating the overlaid comparison of the latitude and longitude based spherical spatial discretization function binning in FIG. 19A and the 3D binning mesh geometry in FIG. 19B.

FIGS. 19A-19C illustrate the alignment of the 3D binning mesh used for precomputation of geofence edge-spatial bin associations with a simple spherical spatial discretization function in accordance with an illustrative embodiment. FIG. 19A illustrates an example of a simple spherical spatial discretization function binning of the earth's surface according to latitude and longitude. FIG. 19B illustrates the equivalent 3D binning mesh used for precomputation of geofence edge-spatial bin associations. As shown in FIG. 19B, space is discretized into a number of pyramidal sections. Each spatial bin area 1910 is defined by a triangular faces (planes) formed by rays 1912 originating from the center of the earth and extending outward into space, thereby forming a pyramidal polyhedron of which the "base" constitutes the spatial bin. Given a position of a vessel, a deterministic function determines in which one of these pyramids that position is located based only on the input positions and not by enumeration of known bins. In contrast to the pyramidal volumes represented in FIG. 19B, FIG. 19A represents latitude and longitude as conical volumes.

FIG. 19C depicts a diagram illustrating the overlay between the simple spherical spatial discretization function in FIG. 19A and the 3D binning mesh in FIG. 19B. A discrepancy in the overlay results in gaps such as gap 1900 between the curved latitude and longitude lines (conical) and the straight edges of the 3D binning mesh (pyramidal), which is shown more clearly in FIG. 20.

Figure 20:
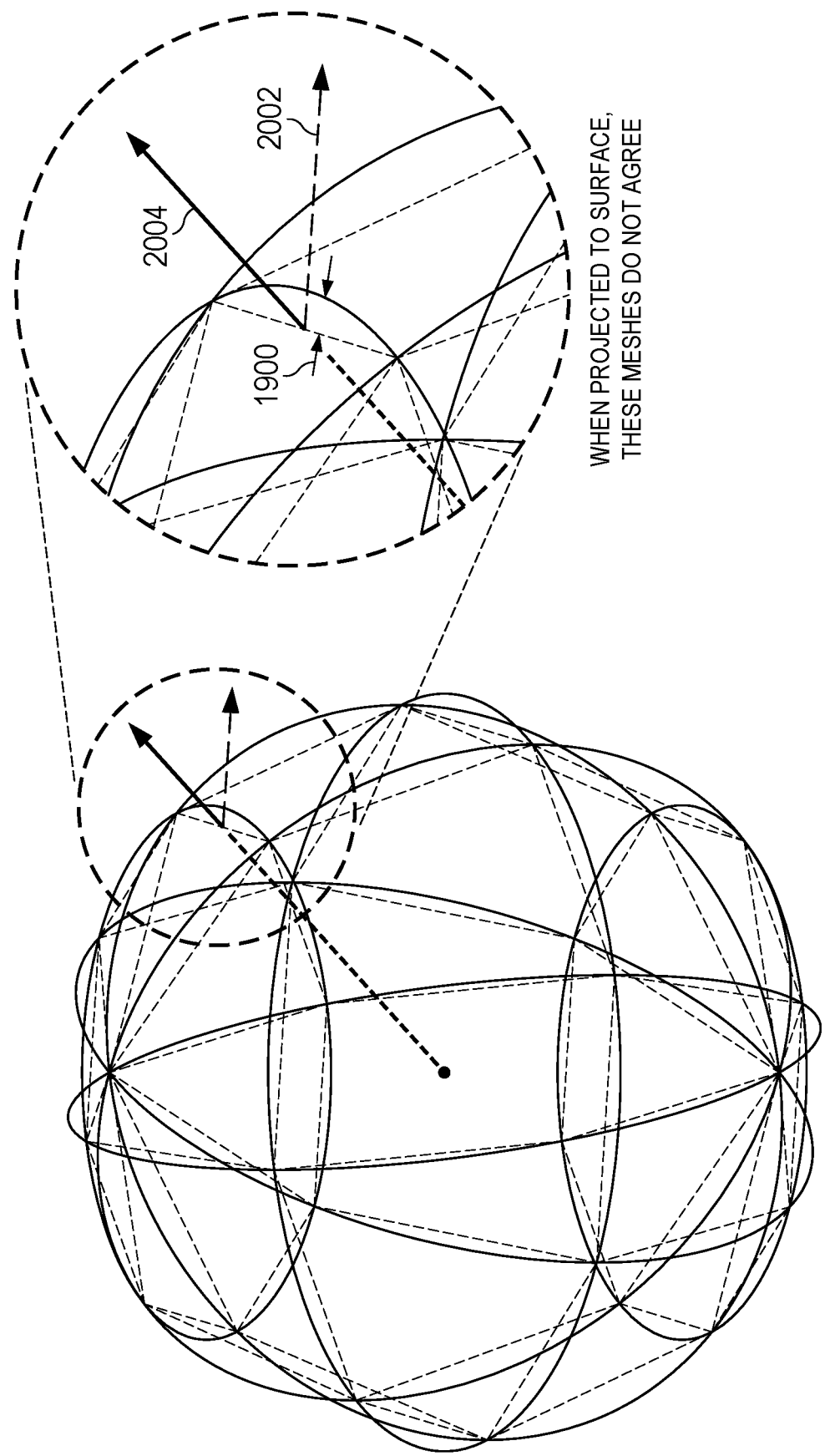
FIG. 20 depicts a diagram illustrating the disagreement in spatial alignment between straight edges of a 3D binning mesh geometry and lines of latitude delineating discretized areas in the spherical spatial discretization function.

FIG. 20 depicts a diagram illustrating the spatial alignment disagreement between straight edges of the 3D binning mesh in 3D space and lines of equal latitude. Representing the straight edges of geofence bins as straight lines in 3D space loses the fact that in 3D space those lines are supposed to represent curvature at particular latitudes and longitudes.

This discrepancy results in gap 1900, which is the difference between being equatorially aligned, as represented by vector 2002, and being aligned to the normal of the surface, as represented by vector 2004.

Figure 21:
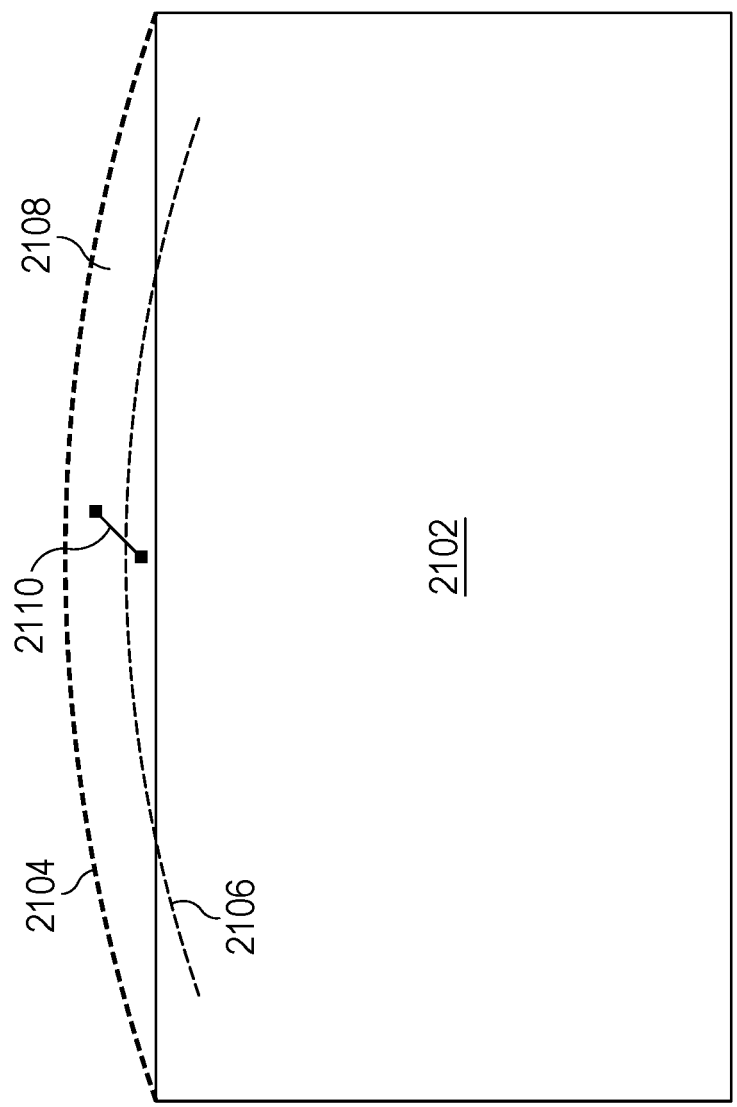
FIG. 21 depicts in a 2D projection a diagram illustrating an example of an edge intersection scenario where spatial misalignment between a spherical spatial discretization function and a representative 3D binning mesh would result in a failure to detect a valid intersection.

FIG. 21 depicts a diagram illustrating an example of an edge intersection scenario involving spatial alignment disagreement. FIG. 21 represents projection of a geofence zone onto a 2D map. Rectangle 2102 represents a simple hashing function in 2D.

Line 2104 represents the distorted edge of a geospatial bin resulting from projection of a 2D mesh onto a 3D surface such as shown in FIG. 20. Line 2106 represents a straight edge of a geofenced area projected into 3D. Because of the distortion from projection of the straight lines of the bin and geofence edges into 3D, part of line 2106 extends into the "dead zone" 2108 resulting from the spatial alignment disagreement described above. As a result, the geofence edge represented by line 2106 crosses outside the definition of the spatial hashing function represented by rectangle 2102.

In this situation, a vessel path represented by line 2110 that intersects the geofence edge represented by line 2106 within the dead zone 2108 would not be detected.

Figure 22C:
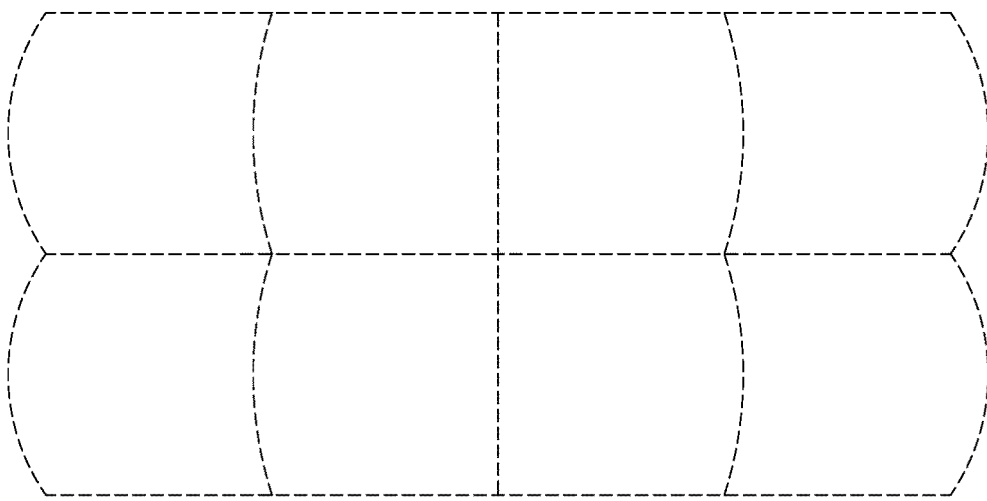
FIG. 22C illustrates a more advanced spherical spatial discretization function that incorporates corrections to align with 3D binning mesh geometry in accordance with an illustrative embodiment.
Figure 22B:
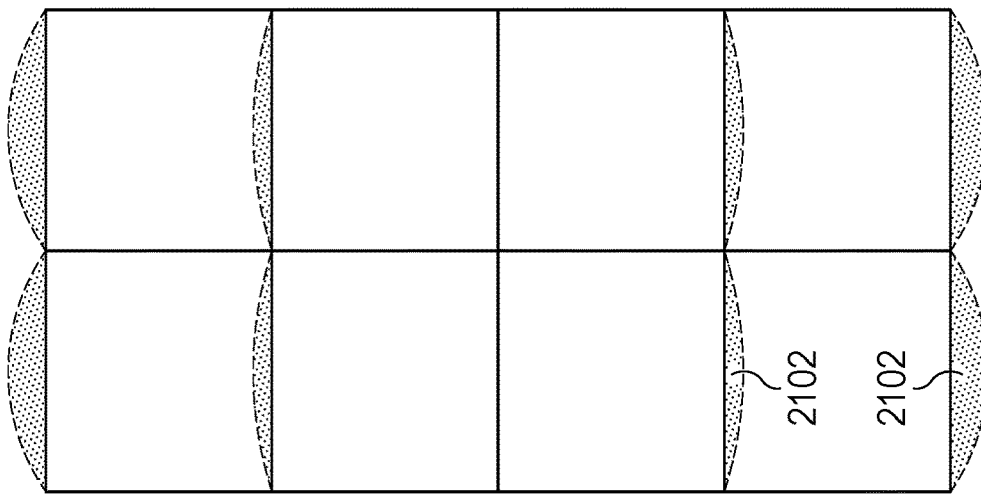
FIG. 22B illustrates in a 2D projection discrepancies resulting from projection of 3D binning mesh geometry projected into 2D when compared to a spherical spatial discretization function based on latitude and longitude.
Figure 22A:
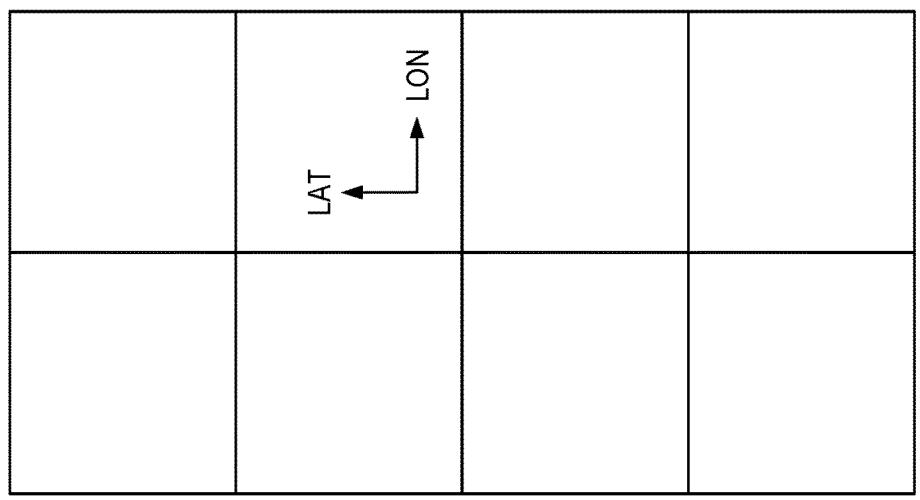
FIG. 22A illustrates in a 2D projection simple binning for the earth's surface according to a spherical spatial discretization function based on latitude and longitude.

FIGS. 22A-22C depict the formulation of a hashing function that accounts for spatial alignment disagreement in accordance with an illustrative embodiment. FIG. 22A illustrates simple binning for the earth's surface according to latitude and longitude. FIG. 22B illustrates in a 2D projection discrepancies resulting from projection of 3D binning mesh geometry projected into 2D when compared to a spherical spatial discretization function based on latitude and longitude. Events that fall within these discrepancy zones 2102 are not reliably detected as described above.

FIG. 22C illustrates a more advanced spherical spatial discretization function that incorporates corrections to align with 3D binning mesh geometry. All positions within a 3D binning mesh bin volume are mapped to the same value, avoiding the scenario shown in FIG. 22B in accordance with an illustrative embodiment. This modification converts the true latitude or longitude into the grid normalized latitude or longitude. As a result, events that fall within the distorted line regions are reliably detected because they are now accounted for in the modified hashing function.

Figure 23:
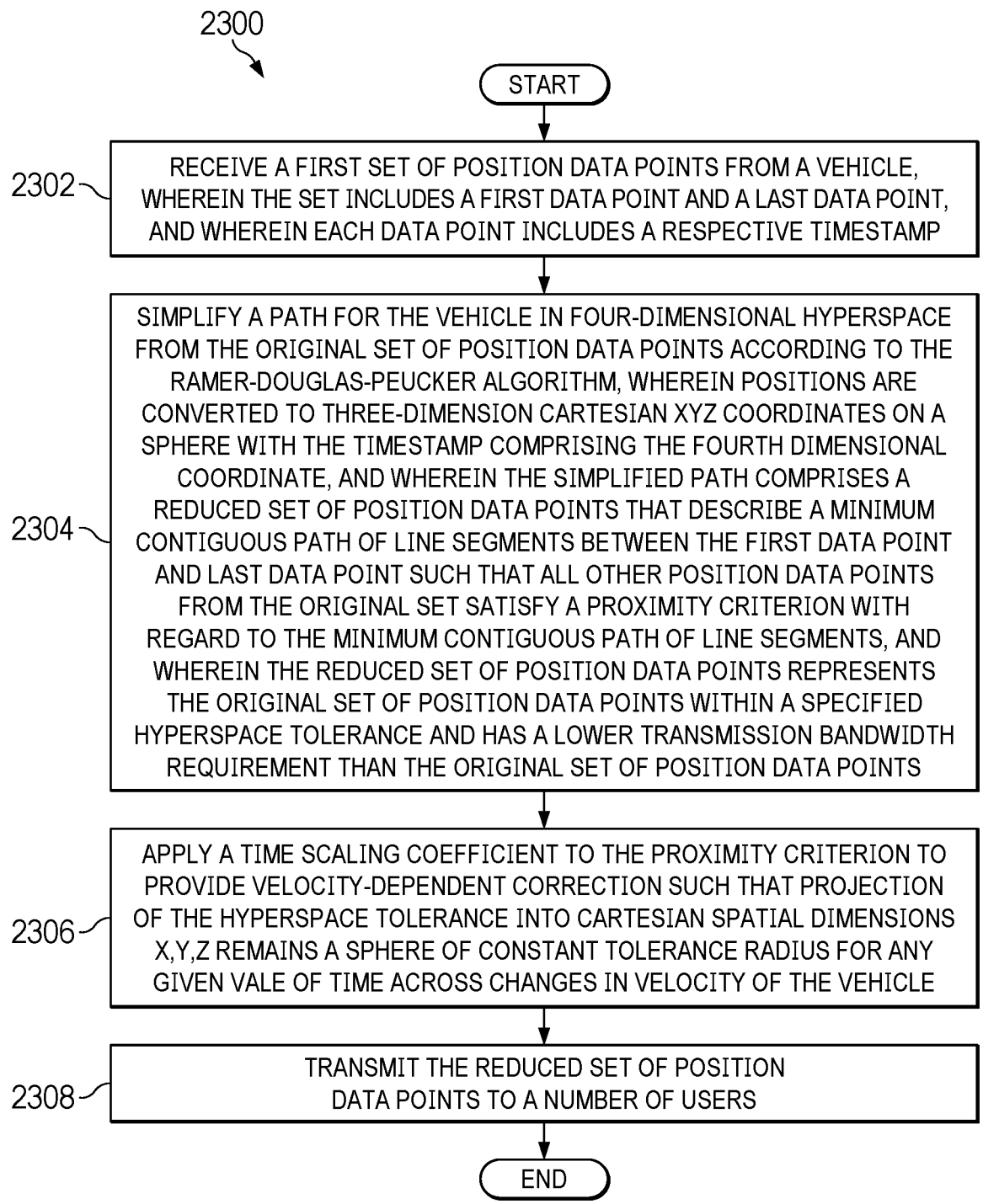
FIG. 23 depicts a flowchart illustrating a process for dynamically down sampling tracking data.

FIG. 23 depicts a flowchart illustrating a process for dynamically down sampling tracking data. Process 2300 might be implemented in tracking and geofence system 200 in FIG. 2.

Process 2300 begins by receiving a first set of position data points from a vehicle, wherein the set includes a first data point and a last data point, and wherein each data point includes a respective timestamp (step 2302). The tracking data might comprise automatic identification system (AIS) data. The tracking data might be received in real-time or comprise historical data.

A path of the vehicle in four-dimensional hyperspace is simplified from the position data points according to the Ramer-Douglas-Peucker algorithm (step 2304). Positions are converted to three-dimension Cartesian XYZ coordinates on a sphere with the timestamp comprising the fourth dimensional coordinate. The simplified path comprises a reduced set of position data points that describe a minimum contiguous path of line segments between the first data point and last data point such that all other position data points from the original set satisfy a proximity criterion with regard to the minimum contiguous path of line segments. This proximity criterion might comprise a threshold perpendicular hyperdistance from the line segments of the minimum contiguous path of line segments. The reduced set of position data points represents the original set of position data points within a specified hyperspace tolerance and has a lower transmission bandwidth requirement than the original set of position data points.

A time scaling coefficient is applied to the proximity criterion to provide velocity-dependent correction such that the projection of the hyperspace tolerance into Cartesian spatial dimensions X,Y,Z remains a sphere of constant tolerance radius for any given vale of time across changes in velocity of the vehicle (step 2306). The time scaling coefficient can be applied as a scaling matrix to calculate perpendicular hyperdistances of position data points from line segments of the minimum contiguous path of line segments.

The reduced set of position data points is transmitted to a number of users (step 2308). Process 2300 then ends.

Figure 24:
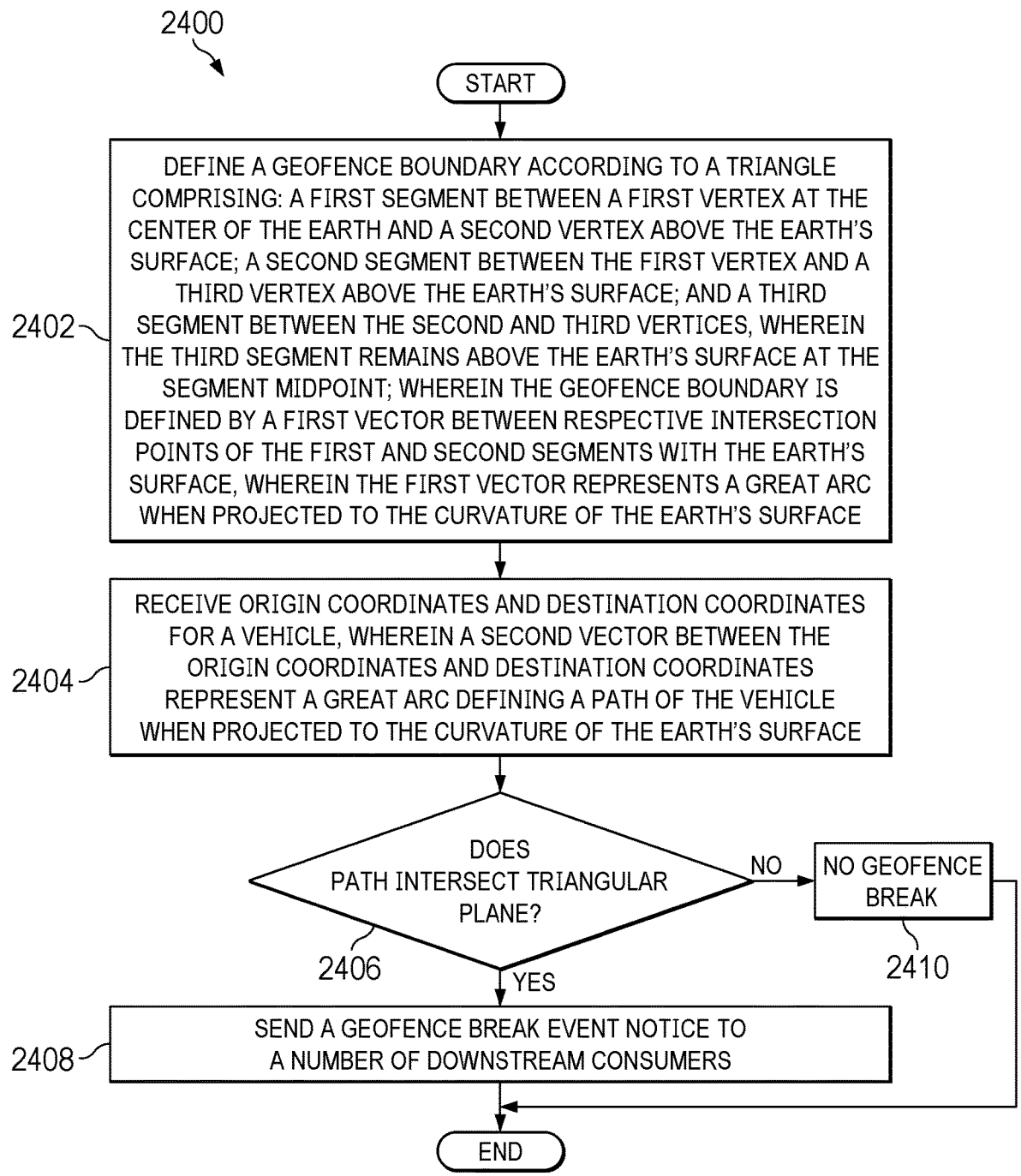
FIG. 24 depicts a flowchart for a process of detecting geofence break events in accordance with an illustrative embodiment.

FIG. 24 depicts a flowchart for a process of detecting geofence break events in accordance with an illustrative embodiment. Process 2400 might be implemented in tracking and geofence system 200 in FIG. 2.

Process 2400 begins by defining a geofence boundary according to a triangle (step 2402). The triangle comprises a first segment between a first vertex at the center of the earth and a second vertex above the earth's surface, a second segment between the first vertex and a third vertex above the earth's surface, and a third segment between the second and third vertices, wherein the third segment remains above the earth's surface at the segment midpoint. The geofence boundary is defined by a first vector between respective intersection points of the first and second segments with the earth's surface, wherein the first vector represents a great arc when projected to the curvature of the earth's surface. The triangle is one of three or more triangles that define respective geofence boundaries enclosing a geofenced area on the earth's surface.

Process 2400 receives origin coordinates and destination coordinates for a vehicle, wherein a second vector between the origin coordinates and destination coordinates represent a great arc defining a path of the vehicle when projected to the curvature of the earth's surface (step 2404). Process 2400 determines whether the second vector intersects the plane defined by the triangle, wherein an intersection of the plane represents a geofence break (step 2406). If there is no intersection, there is no geofence break (step 2410).

Responsive to a determination that the second vector intersects the plane, process 2400 sends a geofence break event notice to a number of downstream consumers (step 2408). These downstream consumers might comprise end users and/or downstream event consuming systems. Process 2400 then ends.

Figure 25:
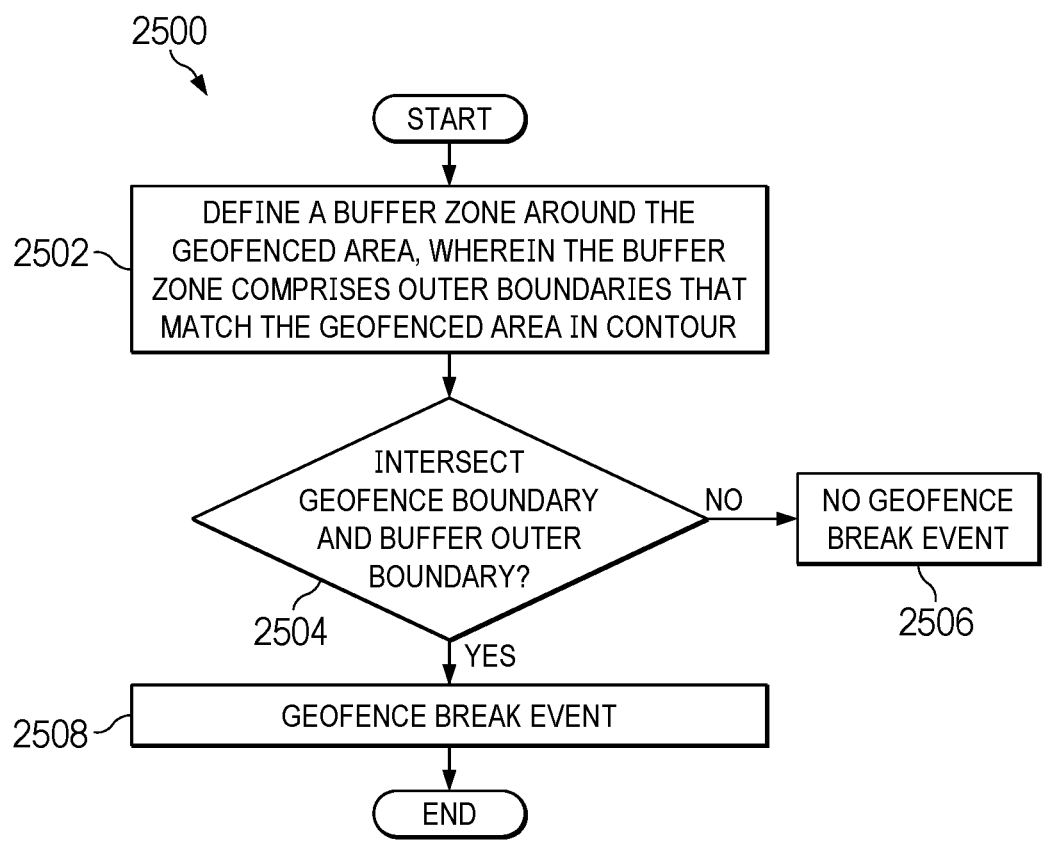
FIG. 25 depicts a flowchart for a process of implementing a geofence buffer zone in accordance with an illustrative embodiment.

FIG. 25 depicts a flowchart for a process of implementing a geofence buffer zone in accordance with an illustrative embodiment. Process 2500 is a possible extension of step 2406 in FIG. 24.

Process 2500 begins by defining a buffer zone around the geofenced area, wherein the buffer zone comprises outer boundaries that match the geofenced area in contour (step 2502). To determine if there is a geofence break, process 2500 determines whether the vehicle path intersects both a geofence boundary and an out boundary of the buffer zone (step 2504).

If the vehicle path does not intersect both the geofence area boundary and outer buffer zone boundary no geofence event is sent (step 2506).

Process 2500 sends a geofence break event notice only when the path of the vehicle intersects both a geofence boundary of the geofenced area and an outer boundary of the buffer zone (step 2508). Process 2500 then end.

Figure 26:
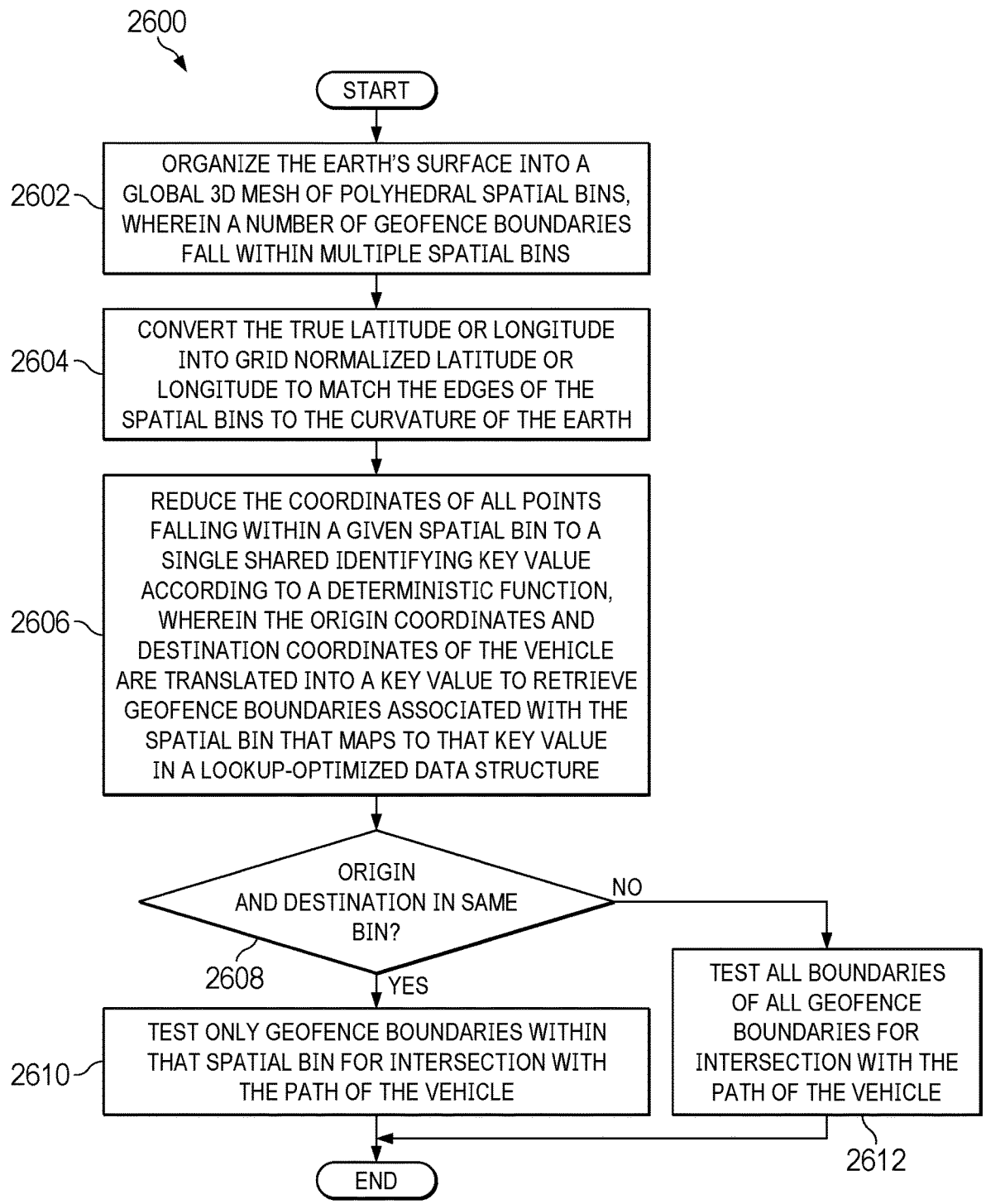
FIG. 26 depicts a flowchart for a process of geospatial binning in accordance with an illustrative embodiment.

FIG. 26 depicts a flowchart for a process of geospatial binning in accordance with an illustrative embodiment. Process 2600 is a possible preliminary to process 2400 in FIG. 24.

Process 2600 begins by organizing the earth's surface into a global three-dimensional mesh of polyhedral spatial bins, wherein a number of geofence boundaries fall within multiple spatial bins (step 2602). Process 2600 might convert the true latitude or longitude into grid normalized latitude or longitude to match the edges of the spatial bins to the curvature of the earth (step 2604).

Process 2600 can reduce the coordinates of all points falling within a given spatial bin to a single shared identifying key value according to a deterministic function, wherein the origin coordinates and destination coordinates of the vehicle are translated into a key value to retrieve geofence boundaries associated with the spatial bin that maps to that key value in a lookup-optimized data structure (step 2606).

When the origin and destination coordinates are received, process 2600 determines whether they are in the same bin (step 2608). Responsive to a determination that the origin coordinates and destination coordinates are located within a single spatial, process 2600 tests only geofence boundaries within that spatial bin for intersection with the path of the vehicle.

Responsive to a determination that the origin coordinates and destination coordinates are located in different spatial bins, process 2600 tests all boundaries of all geofenced areas for intersection with the path of the vehicle (step 2612). Process 2600 then ends.

Figure 27:
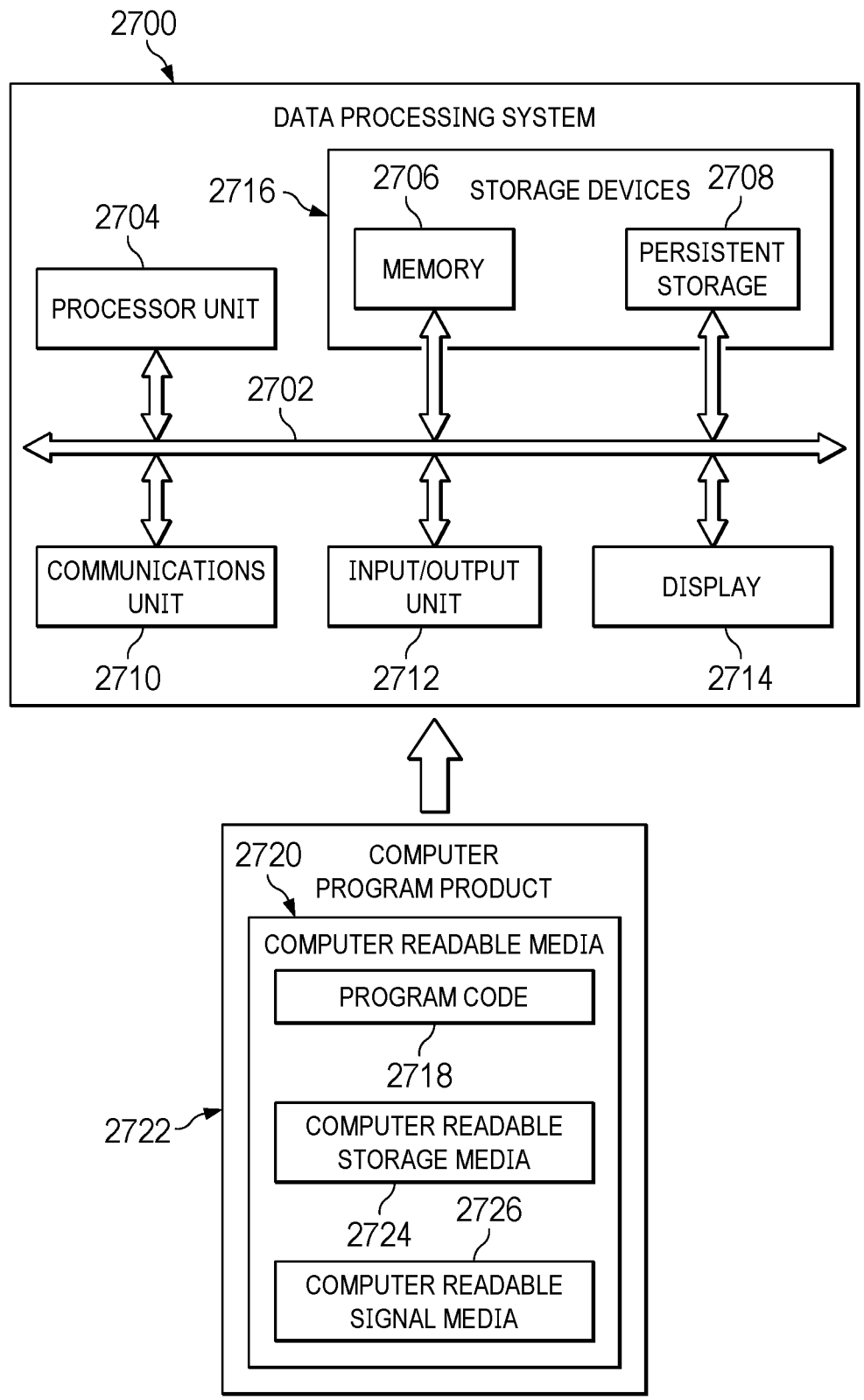
FIG. 27 is a block diagram of a data processing system in accordance with an illustrative embodiment.

Turning now to FIG. 27, an illustration of a block diagram of a data processing system is depicted in accordance with an illustrative embodiment. Data processing system 2700 may be used to implement server computer 104 and server computer 106 and client devices 110 in FIG. 1, as well as computer system 260 in FIG. 2. In this illustrative example, data processing system 2700 includes communications framework 2702, which provides communications between processor unit 2704, memory 2706, persistent storage 2708, communications unit 2710, input/output unit 2712, and display 2714. In this example, communications framework 2702 may take the form of a bus system.

Processor unit 2704 serves to execute instructions for software that may be loaded into memory 2706. Processor unit 2704 may be a number of processors, a multi-processor core, or some other type of processor, depending on the particular implementation. In an embodiment, processor unit 2704 comprises one or more conventional general-purpose central processing units (CPUs). In an alternate embodiment, processor unit 2704 comprises one or more graphical processing units (GPUs).

Memory 2706 and persistent storage 2708 are examples of storage devices 2716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2716 may also be referred to as computer-readable storage devices in these illustrative examples. Memory 2706, in these examples, may be, for example, a random access memory or any other suitable volatile or non-volatile storage device. Persistent storage 2708 may take various forms, depending on the particular implementation.

For example, persistent storage 2708 may contain one or more components or devices. For example, persistent storage 2708 may be a hard drive, a flash memory, a rewritable optical disk, a rewritable magnetic tape, or some combination of the above. The media used by persistent storage 2708 also may be removable. For example, a removable hard drive may be used for persistent storage 2708. Communications unit 2710, in these illustrative examples, provides for communications with other data processing systems or devices. In these illustrative examples, communications unit 2710 is a network interface card.

Input/output unit 2712 allows for input and output of data with other devices that may be connected to data processing system 2700. For example, input/output unit 2712 may provide a connection for user input through at least one of a keyboard, a mouse, or some other suitable input device. Further, input/output unit 2712 may send output to a printer. Display 2714 provides a mechanism to display information to a user.

Instructions for at least one of the operating system, applications, or programs may be located in storage devices 2716, which are in communication with processor unit 2704 through communications framework 2702. The processes of the different embodiments may be performed by processor unit 2704 using computer-implemented instructions, which may be located in a memory, such as memory 2706.

These instructions are referred to as program code, computer-usable program code, or computer-readable program code that may be read and executed by a processor in processor unit 2704. The program code in the different embodiments may be embodied on different physical or computer-readable storage media, such as memory 2706 or persistent storage 2708.

Program code 2718 is located in a functional form on computer-readable media 2720 that is selectively removable and may be loaded onto or transferred to data processing system 2700 for execution by processor unit 2704. Program code 2718 and computer-readable media 2720 form computer program product 2722 in these illustrative examples. In one example, computer-readable media 2720 may be computer-readable storage media 2724 or computer-readable signal media 2726.

In these illustrative examples, computer-readable storage media 2724 is a physical or tangible storage device used to store program code 2718 rather than a medium that propagates or transmits program code 2718. Computer readable storage media 2724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2718 may be transferred to data processing system 2700 using computer-readable signal media 2726. Computer-readable signal media 2726 may be, for example, a propagated data signal containing program code 2718. For example, computer-readable signal media 2726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2700 are not meant to provide architectural limitations to the manner in which different embodiments may be implemented. The different illustrative embodiments may be implemented in a data processing system including components in addition to or in place of those illustrated for data processing system 2700. Other components shown in FIG. 27 can be varied from the illustrative examples shown. The different embodiments may be implemented using any hardware device or system capable of running program code 2718.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of dynamically down sampling vehicle tracking data, the method comprising:
   receiving an original set of position data points from a vehicle, wherein the set includes a first data point and a last data point, and wherein each data point includes a respective timestamp;
   simplifying a path for the vehicle in four-dimensional hyperspace from the original set of position data points according to the Ramer-Douglas-Peucker algorithm to reduce real-time transmission burdens, wherein positions are converted to three-dimension Cartesian XYZ coordinates on a sphere with the timestamp comprising the fourth dimensional coordinate, and wherein the simplified path comprises a reduced set of position data points that describe a minimum contiguous path of line segments between the first data point and last data point such that all other position data points from the original set satisfy a proximity criterion with regard to the minimum contiguous path of line segments, and wherein the reduced set of position data points represents the original set of position data points within a specified hyperspace tolerance, wherein a time scaling coefficient applied to the proximity criterion provides velocity-dependent correction such that projection of the hyperspace tolerance into Cartesian spatial dimensions X,Y,Z remains a sphere of constant tolerance radius for any given value of time across changes in velocity of the vehicle, and wherein the reduced set of position data points has a lower transmission bandwidth requirement than the original set of position data points; and
   transmitting the reduced set of position data points to a number of users.

2. The method of claim 1, wherein the proximity criterion comprises a threshold perpendicular hyperdistance from the line segments of the minimum contiguous path of line segments.

3. The method of claim 1, wherein the time scaling coefficient is applied as a scaling matrix to calculate perpendicular hyperdistances of position data points from line segments of the minimum contiguous path of line segments.

4. The method of claim 1, wherein the tracking data comprises automatic identification system (AIS) data.

5. The method of claim 1, wherein the tracking data is received in real-time.

6. The method of claim 1, wherein the tracking data comprises historical data.

7. The method of claim 1, wherein the reduced set of position data points exclude movements of the vehicle an inner boundary and buffer zone of a geofence area that do not represent true ingress or egress from the geofenced area.

8. A system for dynamically down sampling vehicle tracking data, the system comprising:
   a storage device that stores program instructions;
   one or more processors operably connected to the storage device and configured to execute the program instructions to cause the system to:
   receive an original set of position data points from a vehicle, wherein the set includes a first data point and a last data point, and wherein each data point includes a respective timestamp;
   simplify a path for the vehicle in four-dimensional hyperspace from the original set of position data points according to the Ramer-Douglas-Peucker algorithm to reduce real-time transmission burdens, wherein positions are converted to three-dimension Cartesian XYZ coordinates on a sphere with the timestamp comprising the fourth dimensional coordinate, and wherein the simplified path comprises a reduced set of position data points that describe a minimum contiguous path of line segments between the first data point and last data point such that all other position data points from the original set satisfy a proximity criterion with regard to the minimum contiguous path of line segments, and wherein the reduced set of position data points represents the original set of position data points within a specified hyperspace tolerance, wherein a time scaling coefficient applied to the proximity criterion provides velocity-dependent correction such that projection of the hyperspace tolerance into Cartesian spatial dimensions X,Y,Z remains a sphere of constant tolerance radius for any given value of time across changes in velocity of the vehicle, and wherein the reduced set of position data points has a lower transmission bandwidth requirement than the original set of position data points; and
   transmit the reduced set of position data points to a number of users.

9. The system of claim 1, wherein the proximity criterion comprises a threshold perpendicular hyperdistance from the line segments of the minimum contiguous path of line segments.

10. The system of claim 8, wherein the time scaling coefficient is applied as a scaling matrix to calculate perpendicular hyperdistances of position data points from line segments of the minimum contiguous path of line segments.

11. The system of claim 1, wherein the tracking data comprises automatic identification system (AIS) data.

12. The system of claim 1, wherein the tracking data is received in real-time.

13. The system of claim 1, wherein the tracking data comprises historical data.

14. The system of claim 8, wherein the reduced set of position data points exclude movements of the vehicle an inner boundary and buffer zone of a geofence area that do not represent true ingress or egress from the geofenced area.

15. A computer program product for dynamically down sampling vehicle tracking data, the computer program product comprising:
- a computer-readable storage medium having program instructions embodied thereon to perform the steps of:
- receiving an original set of position data points from a vehicle, wherein the set includes a first data point and a last data point, and wherein each data point includes a respective timestamp;
- simplifying a path for the vehicle in four-dimensional hyperspace from the original set of position data points according to the Ramer-Douglas-Peucker algorithm to reduce real-time transmission burdens, wherein positions are converted to three-dimension Cartesian XYZ coordinates on a sphere with the timestamp comprising the fourth dimensional coordinate, and wherein the simplified path comprises a reduced set of position data points that describe a minimum contiguous path of line segments between the first data point and last data point such that all other position data points from the original set satisfy a proximity criterion with regard to the minimum contiguous path of line segments, and wherein the reduced set of position data points represents the original set of position data points within a specified hyperspace tolerance, wherein a time scaling coefficient applied to the proximity criterion provides velocity-dependent correction such that projection of the hyperspace tolerance into Cartesian spatial dimensions X,Y,Z remains a sphere of constant tolerance radius for any given value of time across changes in velocity of the vehicle, and wherein the reduced set of position data points has a lower transmission bandwidth requirement than the original set of position data points; and
- transmitting the reduced set of position data points to a number of users.

16. The computer program product of claim 15, wherein the proximity criterion comprises a threshold perpendicular hyperdistance from the line segments of the minimum contiguous path of line segments.

17. The computer program product of claim 15, wherein the time scaling coefficient is applied as a scaling matrix to calculate perpendicular hyperdistances of position data points from line segments of the minimum contiguous path of line segments.

18. The computer program product of claim 1, wherein the tracking data comprises automatic identification system (AIS) data.

19. The computer program product of claim 1, wherein the tracking data is received in real-time.

20. The computer program product of claim 1, wherein the tracking data comprises historical data.

21. The computer program product of claim 15, wherein the reduced set of position data points exclude movements of the vehicle an inner boundary and buffer zone of a geofence area that do not represent true ingress or egress from the geofenced area.

* * * * *